United States Patent
Ikeda

(10) Patent No.: US 9,488,518 B2
(45) Date of Patent: Nov. 8, 2016

(54) BRIGHTNESS CALCULATING APPARATUS, CONTROL METHOD FOR BRIGHTNESS CALCULATING APPARATUS, AND DISPLAY APPARATUS

(71) Applicant: CANON KABUSHIKI KAISHA, Tokyo (JP)

(72) Inventor: Takeshi Ikeda, Ebina (JP)

(73) Assignee: Canon Kabushiki Kaisha, Tokyo (JP)

(*) Notice: Subject to any disclaimer, the term of this patent is extended or adjusted under 35 U.S.C. 154(b) by 370 days.

(21) Appl. No.: 13/961,174

(22) Filed: Aug. 7, 2013

(65) Prior Publication Data

US 2014/0043350 A1 Feb. 13, 2014

(30) Foreign Application Priority Data

Aug. 9, 2012 (JP) .................. 2012-177351
Jun. 5, 2013 (JP) .................. 2013-118762

(51) Int. Cl.
*G09G 5/02* (2006.01)
*G01J 1/02* (2006.01)
(Continued)

(52) U.S. Cl.
CPC .............. *G01J 1/02* (2013.01); *G09G 3/3426* (2013.01); *G09G 5/10* (2013.01); *G09G 2320/0238* (2013.01); *G09G 2320/0285* (2013.01); *G09G 2360/16* (2013.01)

(58) Field of Classification Search
CPC ... G09G 3/3426; G09G 5/10; G09G 2360/16
See application file for complete search history.

(56) References Cited

U.S. PATENT DOCUMENTS 8,217,968 B2 7/2012 Sano et al.
8,368,726 B2 * 2/2013 Amino .................. G09G 3/3426
                                                                  345/102
(Continued)

FOREIGN PATENT DOCUMENTS

JP  2002-099250 A  4/2002
JP  2010-164851 A  7/2010
(Continued)

OTHER PUBLICATIONS

Japanese Office Action dated May 27, 2014, issued in counterpart Japanese Application No. 2013-118762.
(Continued)

*Primary Examiner* — Charles Tseng
(74) *Attorney, Agent, or Firm* — Fitzpatrick, Cella, Harper & Scinto

(57) ABSTRACT

A brightness calculating apparatus according to the present invention includes: a setting unit configured to set an calculation target position on an emission surface; a sectioning unit configured to section a plurality of light sources into a plurality of sectioned regions in accordance with the calculation target position set by the setting unit; and a calculating unit configured to calculate the brightness at the calculation target position when light is emitted from the plurality of light sources by calculating, for each of the sectioned regions, the brightness at the calculation target position due to light sources in the sectioned region and summing up calculation results of the respective sectioned regions, wherein the sectioning unit sections light sources outside of a predetermined range from the calculation target position more roughly than light sources inside of the predetermined range from the calculation target position.

20 Claims, 20 Drawing Sheets

(51) Int. Cl.
*G09G 5/10* (2006.01)
*G09G 3/34* (2006.01)

(56) References Cited

U.S. PATENT DOCUMENTS

| | | | |
|---|---|---|---|
| 2010/0110112 A1* | 5/2010 | Nakanishi | G09G 3/3426 345/690 |
| 2010/0117948 A1* | 5/2010 | Hiramatsu | G09G 3/3426 345/102 |
| 2011/0007104 A1 | 1/2011 | Nakazawa et al. | |
| 2011/0304657 A1 | 12/2011 | Yamamura et al. | |
| 2012/0044222 A1* | 2/2012 | Jung | G09G 3/3426 345/207 |

FOREIGN PATENT DOCUMENTS

| | | |
|---|---|---|
| JP | 2012-068655 A | 4/2012 |
| WO | 2009/110456 A1 | 9/2009 |
| WO | 2011/039996 A1 | 4/2011 |

OTHER PUBLICATIONS

Japanese Office Action dated Sep. 16, 2014, issued in counterpart Japanese Application No. 2013-118762.

Japanese Office Action issued in counterpart Japanese Patent Application No. 2014-253142, dated Oct. 6, 2015.

English-language translation of Japanese Office Action dated Sep. 16, 2014, issued in counterpart Japanese Application No. 2013-118762.

* cited by examiner

FIG. 3

|   | 1  | 2  | 3  | 4  | 5   | 6   | 7  | 8  | 9  | 10 |
|---|----|----|----|----|-----|-----|----|----|----|----|
| 1 | 10 | 10 | 10 | 10 | 10  | 10  | 10 | 10 | 10 | 10 |
| 2 | 10 | 10 | 60 | 10 | 10  | 10  | 10 | 10 | 10 | 10 |
| 3 | 10 | 10 | 10 | 10 | 100 | 100 | 10 | 70 | 10 | 10 |
| 4 | 10 | 10 | 10 | 10 | 100 | 100 | 10 | 10 | 80 | 10 |
| 5 | 30 | 30 | 30 | 40 | 45  | 40  | 10 | 10 | 10 | 10 |
| 6 | 30 | 30 | 30 | 30 | 30  | 30  | 35 | 35 | 30 | 30 |
| 7 | 30 | 30 | 30 | 30 | 30  | 30  | 30 | 30 | 30 | 30 |
| 8 | 30 | 30 | 30 | 30 | 30  | 30  | 30 | 30 | 30 | 30 |

FIG. 7

|   | 1 | 2 | 3 | 4 | 5 | 6 | 7 | 8 | 9 | 10 |
|---|---|---|---|---|---|---|---|---|---|----|
| 1 | 0.6182 | 0.6755 | 0.7154 | 0.7154 | 0.6755 | 0.6182 | 0.55 | 0.4752 | 0.3963 | 0.3146 |
| 2 | 0.6755 | 0.7454 | 0.7988 | 0.7988 | 0.7454 | 0.6755 | 0.5975 | 0.5153 | 0.4308 | 0.3448 |
| 3 | 0.7154 | 0.7988 | 0.8727 | 0.8727 | 0.7988 | 0.7154 | 0.6289 | 0.5411 | 0.4526 | 0.3636 |
| 4 | 0.7154 | 0.7988 | 0.8727 | 0.8727 | 0.7988 | 0.7154 | 0.6289 | 0.5411 | 0.4526 | 0.3636 |
| 5 | 0.6755 | 0.7454 | 0.7988 | 0.7988 | 0.7454 | 0.6755 | 0.5975 | 0.5153 | 0.4308 | 0.3448 |
| 6 | 0.6182 | 0.6755 | 0.7154 | 0.7154 | 0.6755 | 0.6182 | 0.55 | 0.4752 | 0.3963 | 0.3146 |
| 7 | 0.55 | 0.5975 | 0.6289 | 0.6289 | 0.5975 | 0.55 | 0.4909 | 0.4237 | 0.351 | 0.2744 |
| 8 | 0.4752 | 0.5153 | 0.5411 | 0.5411 | 0.5153 | 0.4752 | 0.4237 | 0.3636 | 0.2971 | 0.2258 |

*FIG. 15*

| BX | BY | d |
|---|---|---|
| 0 | 0 | 0 |
| 0 | 1 | 16 |
| 0 | 2 | 32 |
| 0 | 3 | 48 |
| 0 | 4 | 64 |
| 0 | 5 | 80 |
| 0 | 6 | 96 |
| 0 | 7 | 112 |
| 0 | 8 | 128 |
| 0 | 9 | 144 |
| 0 | 10 | 160 |
| 0 | 11 | 176 |
| 0 | 12 | 192 |
| 0 | 13 | 208 |
| 0 | 14 | 224 |
| 0 | 15 | 240 |
| 0 | 16 | 256 |
| 1 | 0 | 16 |
| 1 | 1 | 23 |
| 1 | 2 | 36 |
| 1 | 3 | 51 |
| 1 | 4 | 66 |
| 1 | 5 | 82 |
| 1 | 6 | 97 |
| 1 | 7 | 113 |
| 1 | 8 | 129 |
| 1 | 9 | 145 |
| 1 | 10 | 161 |
| 1 | 11 | 177 |
| 1 | 12 | 193 |
| 1 | 13 | 209 |
| 1 | 14 | 225 |
| 1 | 15 | 241 |
| 1 | 16 | 256 |
| 2 | 0 | 32 |
| 2 | 1 | 36 |
| 2 | 2 | 45 |
| ⋮ | ⋮ | ⋮ |
| 20 | 12 | 373 |
| 20 | 13 | 382 |
| 20 | 14 | 391 |
| 20 | 15 | 400 |
| 20 | 16 | 410 |

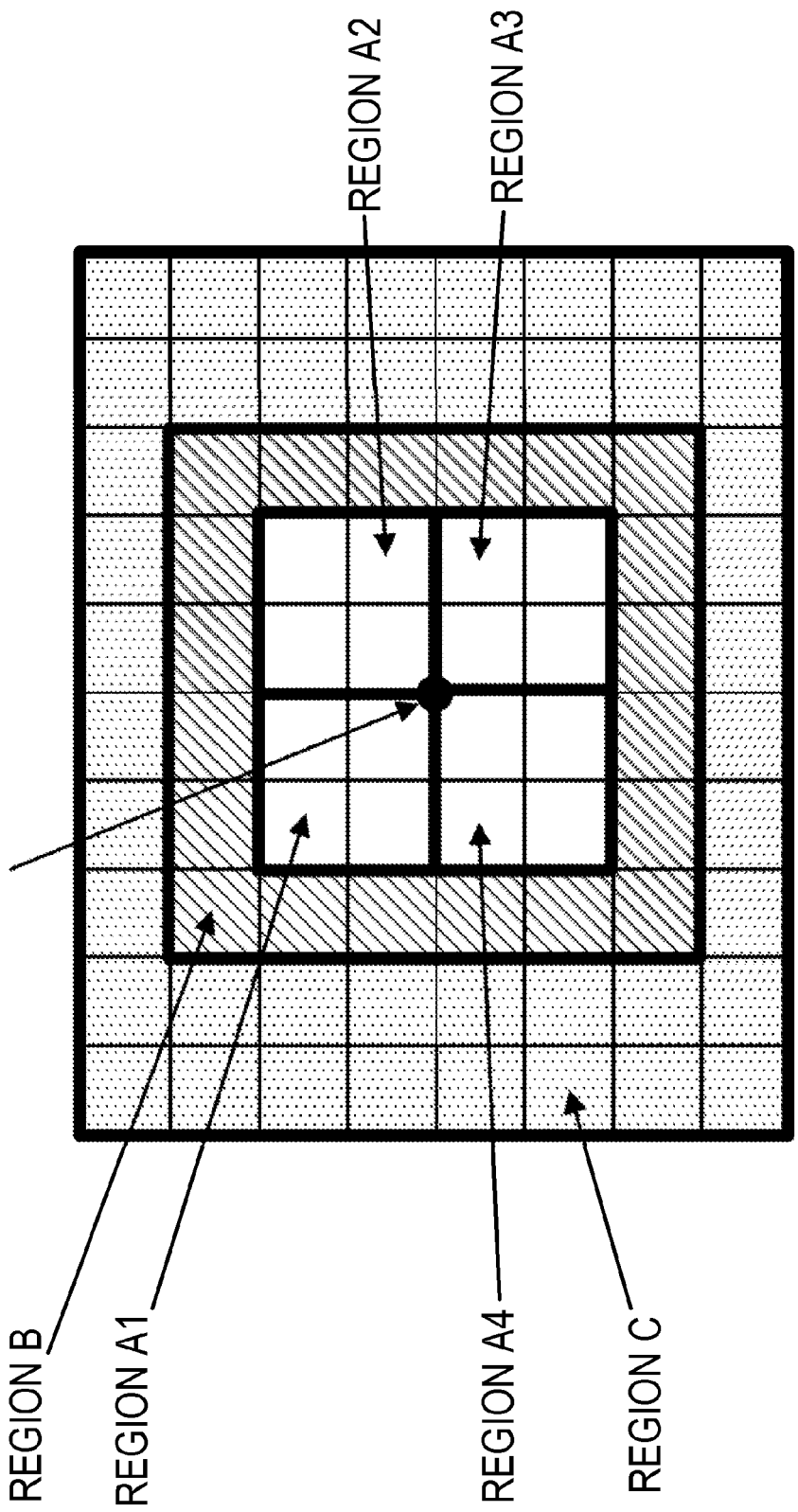

BRIGHTNESS CALCULATING APPARATUS, CONTROL METHOD FOR BRIGHTNESS CALCULATING APPARATUS, AND DISPLAY APPARATUS

BACKGROUND OF THE INVENTION

1. Field of the Invention

The present invention relates to a brightness calculating apparatus, a control method for the brightness calculating apparatus, and a display apparatus.

2. Description of the Related Art

Conventionally, there is a technique for controlling emission brightness of a backlight and transmittance of a liquid crystal panel based on an image signal for each divided region that is obtained by dividing a screen of a liquid crystal display apparatus (refer to Japanese Patent Application Laid-open No. 2002-99250). Using such a technique enables an unacceptably bright black level of a dark part of an image to be suppressed and contrast to be enhanced.

Generally, brightness on an emission surface (a surface that emits light) of a backlight is not uniform. Controlling the transmittance of a liquid crystal panel in accordance with emission brightness of a backlight without taking brightness distribution on an emission surface into consideration prevents an accurate gradation expression from being performed (causes an error in a gradation expression) and diminishes the contrast enhancement effect described above. Therefore, in order to obtain a high contrast enhancement effect, the brightness distribution on the emission surface (the brightness of each position on the emission surface) must be accurately estimated and the transmittance of the liquid crystal panel must be controlled (an image signal must be corrected) in consideration of an estimation result. An example of a technique for estimating a brightness distribution on an emission surface and correcting an image signal based on an estimation result thereof is disclosed in Japanese Patent Application Laid-open No. 2010-164851.

A backlight (surface light source) capable of controlling emission brightness for each divided region has a plurality of sub surface light sources corresponding to a plurality of divided regions. The plurality of sub surface light sources can be individually controlled. For example, the sub surface light sources have a direct backlight structure (a structure in which a light source such as an LED is arranged directly underneath a screen and light from the light source is diffused by a diffuser plate). In the case of such a backlight, the brightness at each position on the emission surface of the backlight is affected not only by light from a corresponding sub surface light source but also by light from other sub surface light sources. Therefore, in order to accurately calculate the brightness at each position on the emission surface, the light from other sub surface light sources must be taken into consideration in addition to the light from a corresponding sub surface.

Conceivable methods of accurately calculating the brightness at each position on an emission surface include a method in which, for each position on the emission surface, brightness of light from each sub surface light source at the position is calculated, and for each position on the emission surface, a total value of the brightness of the position (the brightness of each sub surface light source) is calculated.

However, such methods involve an enormous amount of computations for calculating the brightness at each position on an emission surface. In particular, an enormous amount of computations is required when there are a large number of sub surface light sources.

SUMMARY OF THE INVENTION

The present invention provides a technique that enables brightness at each position on an emission surface of a surface light source including a plurality of sub surface light sources to be accurately calculated with a small amount of computations.

The present invention in its first aspect provides a brightness calculating apparatus that calculates brightness at a calculation target position on an emission surface when light is emitted from a plurality of light sources, the brightness calculating apparatus comprising:

a setting unit configured to set an calculation target position on the emission surface;

a sectioning unit configured to section the plurality of light sources into a plurality of sectioned regions in accordance with the calculation target position set by the setting unit; and a calculating unit configured to calculate the brightness at the calculation target position when light is emitted from the plurality of light sources by calculating, for each of the sectioned regions, the brightness at the calculation target position due to light sources in the sectioned region and summing up calculation results of the respective sectioned regions, wherein the sectioning unit sections light sources outside of a predetermined range from the calculation target position more roughly than light sources inside of the predetermined range from the calculation target position.

The present invention in its second aspect provides a display apparatus comprising:

the brightness calculating apparatus;

a light source unit including a plurality of light sources; and a display unit which transmits light from the light source unit at a transmittance in accordance with image data.

The present invention in its third aspect provides a control method for a brightness calculating apparatus that calculates brightness at a calculation target position on an emission surface when light is emitted from a plurality of light sources, the control method comprising:

setting an calculation target position on the emission surface;

sectioning the plurality of light sources into a plurality of sectioned regions in accordance with the calculation target position set in the setting step; and calculating the brightness at the calculation target position when light is emitted from the plurality of light sources by calculating, for each of the sectioned regions, the brightness at the calculation target position due to light sources in the sectioned region and summing up calculation results of the respective sectioned regions wherein in the sectioning, light sources outside of a predetermined range from the calculation target position are sectioned more roughly than light sources inside of the predetermined range from the calculation target position.

According to the present invention, brightness at each position on an emission surface of a surface light source including a plurality of sub surface light sources can be accurately calculated with a small amount of computations.

Further features of the present invention will become apparent from the following description of exemplary embodiments with reference to the attached drawings.

BRIEF DESCRIPTION OF THE DRAWINGS

FIG. 3 is a diagram showing an example of emission brightness of each sub surface light source according to the first embodiment;

FIG. 7 is a diagram showing an example of a corresponding attenuation coefficient of each subsurface light source according to the first embodiment;

FIG. 15 is a diagram showing an example of a distance calculation LUT according to the second embodiment;

FIG. 20 is a diagram showing an example of a sectioned region according to the third embodiment.

DESCRIPTION OF THE EMBODIMENTS

First Embodiment

Hereinafter, a brightness calculating apparatus, a control method for the brightness calculating apparatus, and a display apparatus according to a first embodiment of the present invention will be described with reference to the drawings.

The brightness calculating apparatus according to the present embodiment calculates (estimates), for each position on an emission surface of a surface light source including a plurality of sub surface light sources that emits light at individually-set emission brightness, brightness when light is emitted from the plurality of sub surface light sources at the set emission brightness. An emission surface is a surface from which light is emitted.

Specifically, the brightness calculating apparatus according to the present embodiment calculates brightness at each position on an emission surface of a backlight included in a display apparatus. A backlight is a surface light source including a plurality of sub surface light sources. In the present embodiment, brightness when light is emitted from each of the sub surface light sources at emission brightness in accordance with input image data is calculated.

Figure 1:
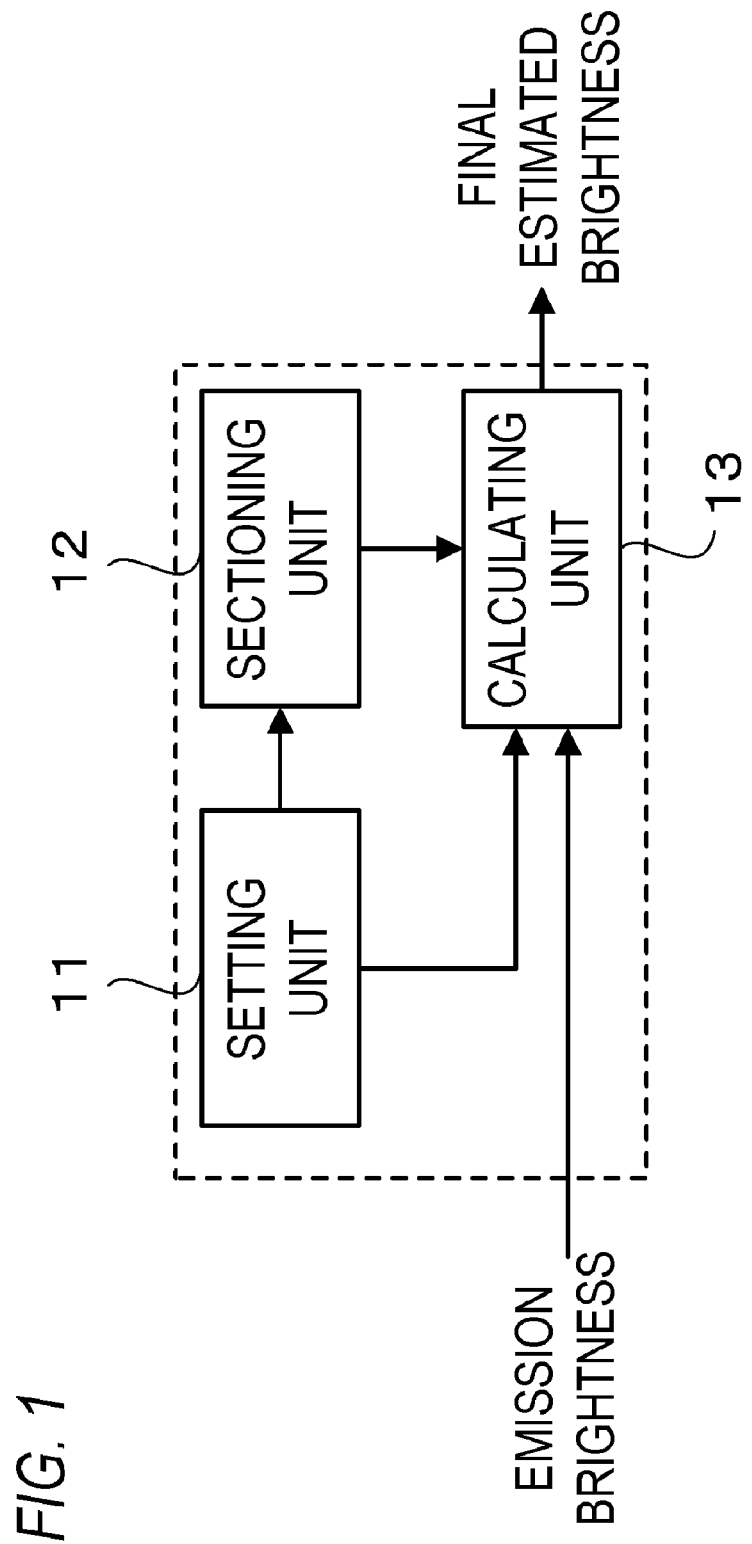
FIG. 1 is a block diagram showing an example of a functional configuration of a brightness calculating apparatus according to a first embodiment.

As shown in FIG. 1, the brightness calculating apparatus according to the present embodiment has a setting unit 11, a sectioning unit 12, a calculating unit 13, and the like.

The setting unit 11 sets each position on the emission surface of the backlight as a target position (calculation target position) that is a position of a calculation target of brightness (brightness at the target position when light is emitted from the plurality of sub surface light sources at the set emission brightness; final estimated brightness).

When calculating the final estimated brightness at the target position, the sectioning unit 12 sections the plurality of sub surface light sources constituting the backlight into a plurality of groups (sectioned regions), each group including one or more sub surface light sources.

When calculating the final estimated brightness at the target position, for each sectioned group (each sectioned region), the calculating unit 13 calculates a corresponding brightness (brightness at the target position) of light emitted by the group based on a corresponding attenuation coefficient (an attenuation coefficient at the target position) of the light. In addition, the calculating unit 13 calculates a sum (a total value) of the calculated corresponding brightness of the respective groups as the final estimated brightness.

When sectioning the plurality of sub surface light sources into a plurality of groups, the sectioning unit 12 sections sub surface light sources that are outside of a predetermined range from the target position more roughly than sub surface light sources that are inside of the predetermined range from the target position.

In this manner, in the present embodiment, subsurface light sources in a vicinity of the target position are finely sectioned when calculating the final estimated brightness. Accordingly, the effect of light from the sub surface light sources in the vicinity of the target position is finely calculated. At the same time, sub surface light sources that are away from the target position are roughly sectioned. Accordingly, the effect of light from sub surface light sources that are away from the target position is roughly calculated. Light from the sub surface light sources that are away from the target position has a smaller effect on the final estimated brightness than light from the sub surface light sources in the vicinity of the target position. Therefore, by finely sectioning the sub surface light sources in the vicinity of the target position and roughly sectioning the sub surface light sources that are away from the target position, the final estimated brightness of the target position can be accurately calculated with a small amount of computations. As a result, the final estimated brightness at each position on the emission surface of a surface light source including a plurality of sub surface light sources can be accurately calculated with a small amount of computations.

In the present embodiment, the sectioning unit 12 sections sub surface light sources that are inside of a predetermined range from the target position into groups including a single sub surface light source and sections sub surface light sources that are outside of the predetermined range from the target position into groups including a plurality of sub surface light sources.

Specifically, the sectioning unit 12 sets one sub surface light source as one group inside the predetermined range from the target position. In addition, for each divided region obtained by dividing the emission surface (a screen of the display apparatus) of the backlight, the sectioning unit 12 sets all sub surface light sources that are outside of the predetermined range from the target position among the sub surface light sources within the divided region as one group. In the present embodiment, a plurality of regions determined in advance is set as the plurality of divided regions. Specifically, a plurality of regions (four regions arranged in two rows and two columns) obtained by dividing the emission surface of the backlight in a matrix pattern based on a center position of the emission surface is set as the plurality of divided regions.

An example of a method of sectioning sub surface light sources will be described with reference to FIGS. 2 to 4.

Figure 2:
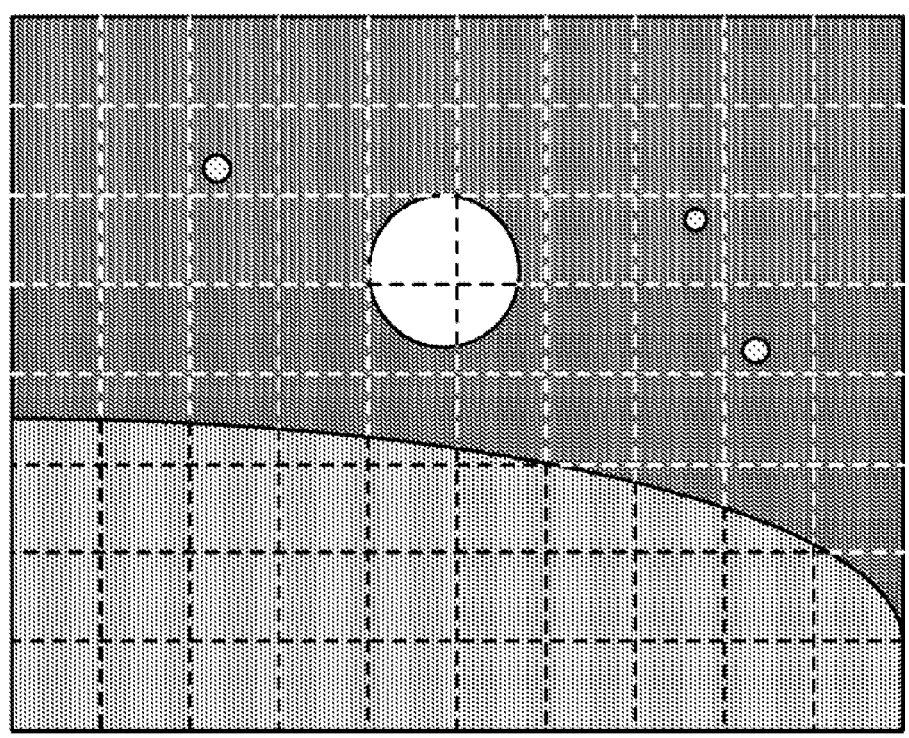
FIG. 2 is a diagram showing an example of input image data according to the first embodiment.

FIG. 2 is a diagram showing an example of input image data. A total of 80 regions arranged in eight rows and ten columns depicted by dashed lines in FIG. 2 correspond to the plurality of sub surface light sources constituting the backlight. In other words, in the present embodiment, the emission surface of the backlight corresponds to a screen of a display apparatus and the backlight is made up of a total of 80 sub surface light sources arranged in eight rows and ten columns.

FIG. 3 shows an example of emission brightness (a control value that drives a sub surface light source) of each sub surface light source in accordance with the input image data shown in FIG. 2. A control value 0 corresponds to an emission brightness of 0 (not lighted) and a control value 100 corresponds to maximum emission brightness. A sub surface light source emits light at corresponding emission brightness (control value). Numerals provided outside of the grid in FIG. 3 represent coordinates of sub surface light sources. The numerals 1 to 10 that are lined up in a horizontal direction represent horizontal coordinates of sub surface light sources. The numerals 1 to 8 that are lined up in a vertical direction represent vertical coordinates of sub surface light sources. For example, a sub surface light source represented by (horizontal coordinate, vertical coordinate)= (3, 2) is a sub surface light source that is third from left and second from top. In the example shown in FIG. 3, the sub surface light source with the coordinates (3, 2) has a control value of 60.

Figure 4:
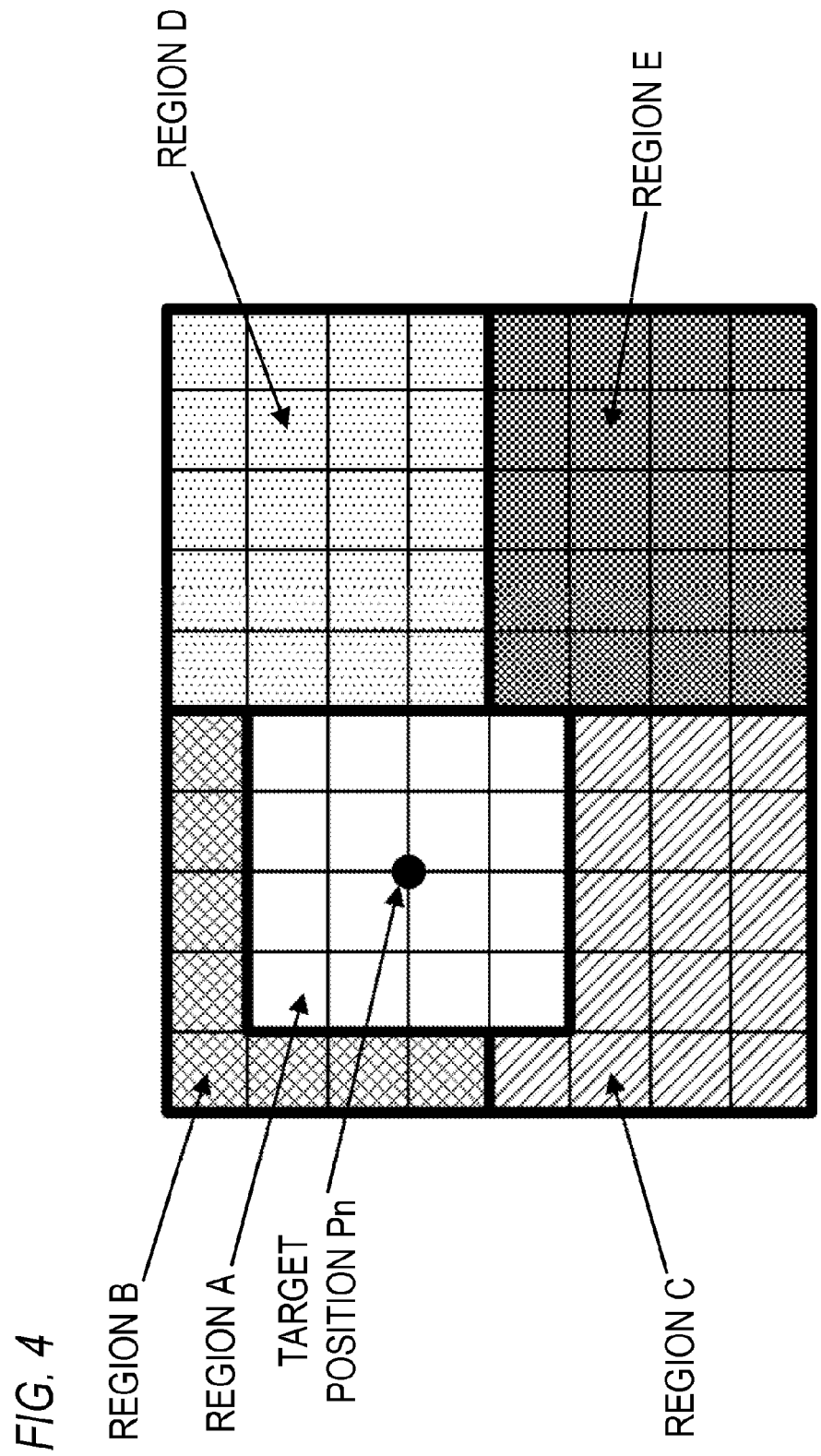
FIG. 4 is a diagram showing an example of a relationship between sub surface light sources and groups according to the first embodiment.

FIG. 4 shows an example of a relationship between sub surface light sources and groups. In FIG. 4, reference symbol Pn denotes a target position. While it is favorable to calculate (estimate) final estimated brightness for all positions on the emission surface of the backlight, doing so requires an enormous amount of computations. Therefore, discrete positions on the emission surface of the backlight are sequentially set (selected) as target positions.

In FIG. 4, a region A is a region for which the effect of light from sub surface light sources is finely calculated, and regions B to E are regions for which the effect of light from sub surface light sources is roughly calculated.

The region A includes a total of 16 sub surface light sources which are arranged in four rows and four columns and which are closest to the target position. In the case of the region A, each of the 16 sub surface light sources in the region A is set as a single group.

The regions B to E are regions that include all sub surface light sources other than those included in the region A among the sub surface light sources in divided regions. In other words, the regions B to E are regions among the divided regions which do not overlap with the region A. In the regions B to E, all of the sub surface light sources in a region are set as a single group. In other words, the region B represents a single group corresponding to an upper left divided region among four divided regions, each arranged in two rows and two columns, based on a center position of the emission surface of the backlight. The region C represents a single group corresponding to a lower left divided region among the four divided regions. The region D represents a single group corresponding to an upper right divided region among the four divided regions. The region E represents a single group corresponding to a lower right divided region among the four divided regions.

Moreover, boundaries between divided regions and boundaries between emission regions need not necessarily be consistent with each other.

Figure 5:
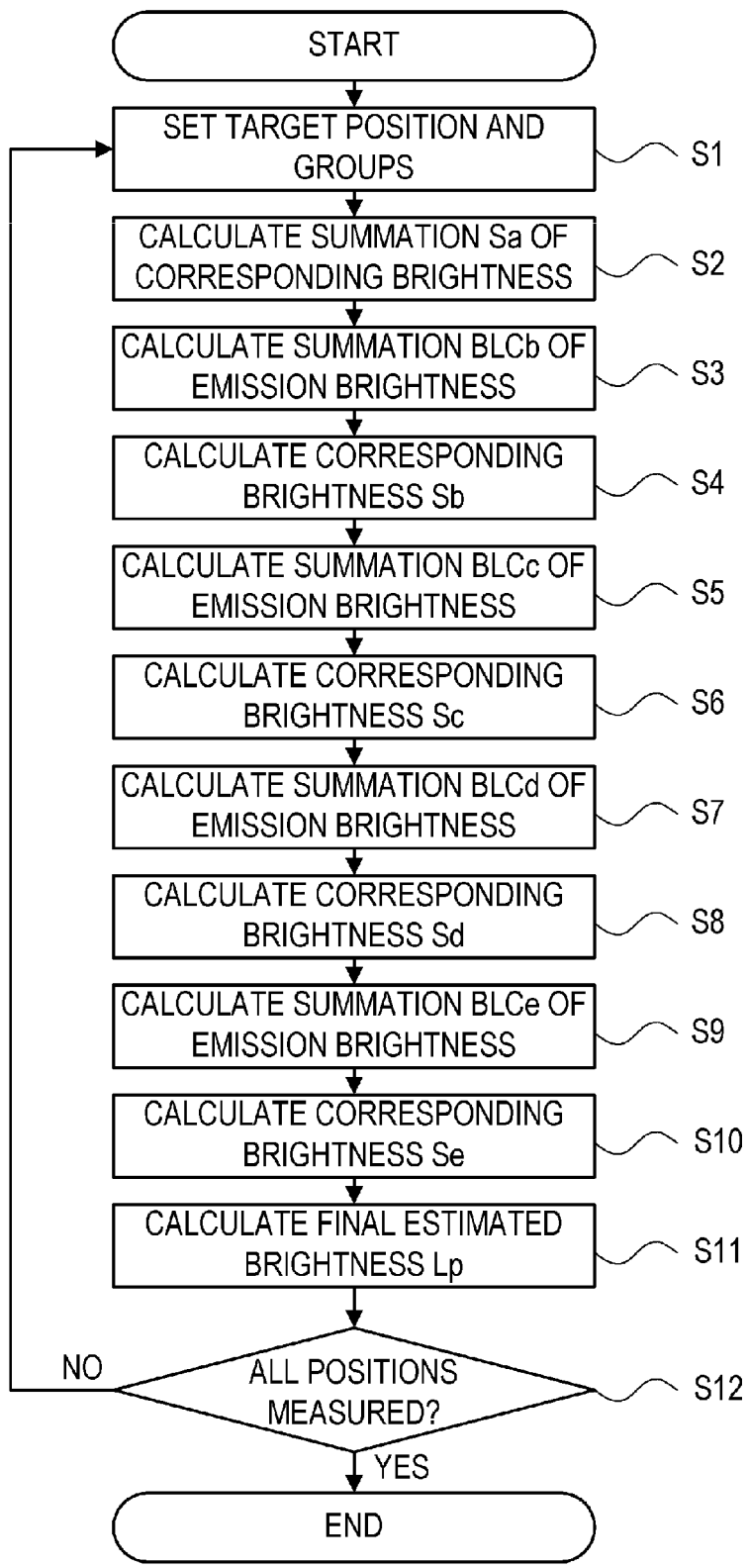
FIG. 5 is a flow chart showing an example of a processing flow of the brightness calculating apparatus according to the first embodiment.

FIG. 5 shows an example of a processing flow when the brightness calculating apparatus calculates final estimated brightness.

First, the setting unit 11 sets a target position. Subsequently, the sectioning unit 12 sections a plurality of sub surface light sources into a plurality of groups based on the set target position (S1). In this example, as shown in FIG. 4, let us assume that a target position Pn and 20 groups including 16 groups in the region A and four groups corresponding to the regions B to E have been set.

Next, the calculating unit 13 calculates a summation Sa of corresponding brightness of light emitted by the 16 groups (sub surface light sources) in the region A (S2). Specifically, for each sub surface light source (group) in the region A, the corresponding brightness of light emitted by the sub surface light source is calculated by multiplying emission brightness (set emission brightness) of the sub surface light source by a corresponding attenuation coefficient of the light emitted by the sub surface light source. Subsequently, the summation Sa of the corresponding brightness of light emitted by the respective sub surface light sources in the region A is calculated. When the target position Pn shown in FIG. 4 is set, as expressed by Equation 1, the summation of the corresponding brightness of light emitted by 16 sub surface light sources represented by coordinates (2, 2) to (5, 2), (2, 3) to (5, 3), (2, 4) to (5, 4), and (2, 5) to (5, 5) is calculated. In Equation 1, $\beta(x, y)$ denotes an attenuation coefficient of light emitted by a sub surface light source represented by coordinates (x, y) at the target position. BLC(x, y) denotes emission brightness (a control value) of the sub surface light source represented by the coordinates (x, y).

$Sa=\beta(2,2)\times BLC(2,2)+\beta(3,2)\times BLC(3,2)+\beta(4,2)\times BLC(4,2)+\beta(5,2)\times BLC(5,2)+\beta(2,3)\times BLC(2,3)+\beta(3,3)\times BLC(3,3)+\beta(4,3)\times BLC(4,3)+\beta(5,3)\times BLC(5,3)+\beta(2,4)\times BLC(2,4)+\beta(3,4)\times BLC(3,4)+\beta(4,4)\times BLC(4,4)+\beta(5,4)\times BLC(5,4)+\beta(2,5)\times BLC(2,5)+\beta(3,5)\times BLC(3,5)+\beta(4,5)\times BLC(4,5)+\beta(5,5)\times BLC(5,5)=\beta(2,2)\times10+\beta(3,2)\times60+\beta(4,2)\times10+\beta(5,2)\times10+\beta(2,3)\times10+\beta(3,3)\times10+\beta(4,3)\times10+\beta(5,3)\times100+\beta(2,4)\times10+\beta(3,4)\times10+13(4,4)\times10+\beta(5,4)\times100+\beta(2,5)\times30+\beta(3,5)\times30+\beta(4,5)\times40+\beta(5,5)\times45$ (Equation 1)

As shown, for the region A, the effect of light from each sub emission area is finely (accurately) calculated.

Subsequently, the calculating unit 13 calculates corresponding brightness of light emitted by the group corresponding to the region B (S3 and S4). In the present embodiment, in the case of a group including a plurality of subsurface light sources such as the group corresponding to the region B, the corresponding brightness of light emitted by the group is calculated by multiplying the summation of emission brightness of the plurality of sub surface light sources by a corresponding attenuation coefficient of light emitted by the group.

In S3, the calculating unit 13 calculates a summation BLCb of the emission brightness of the sub surface light sources in the region B. When the target position Pn shown in FIG. 4 is set, as expressed by Equation 2, a summation of eight sub surface light sources represented by coordinates (1, 1) to (5, 1) and (1, 2) to (1, 4) is calculated.

$$BLCb=BLC(1,1)+BLC(2,1)+BLC(3,1)+BLC(4,1)+\\BLC(5,1)+BLC(1,2)+BLC(1,3)+BLC(1,4)=10+\\10+10+10+10+10+10+10=80 \quad \text{(Equation 2)}$$

In S4, the calculating unit 13 calculates a corresponding brightness Sb of light emitted by the group corresponding to the region B by multiplying the summation BLCb calculated in S3 by a corresponding attenuation coefficient βb of light emitted by the group.

$$Sb=\beta b \times BLCb=80\beta b \quad \text{(Equation 3)}$$

The corresponding attenuation coefficient βb is a representative value of corresponding attenuation coefficients of the plurality of sub surface light sources constituting the group corresponding to the region B. The representative value is an average value, a mode value, a maximum value, a minimum value, an intermediate value, or the like. In the present embodiment, an average value is used as the representative value. Therefore, when the target position Pn shown in FIG. 4 is set, an average value of the corresponding attenuation coefficients of the eight sub surface light sources represented by coordinates (1, 1) to (5, 1) and (1, 2) to (1, 4) is used as βb.

Alternatively, during manufacture or the like, an attenuation coefficient of each position on the emission surface of the backlight may be calculated in advance by uniformly lighting only the sub surface light sources in the region B. As expressed by Equation 4, the corresponding attenuation coefficient βb at the target position can be calculated by dividing a corresponding brightness Ltb when uniformly lighting only the sub surface light sources in the region B by a peak brightness Lpb when uniformly lighting only the sub surface light sources in the region B.

$$\beta b = Ltb/Lpb \quad \text{(Equation 4)}$$

As described above, with the region B, the summation of the emission brightness of sub surface light sources in the region B is multiplied by a corresponding attenuation coefficient. Therefore, with the region B, the corresponding brightness is calculated at a rougher accuracy than the region A.

Subsequently, the calculating unit 13 calculates the corresponding brightness of light emitted by the group corresponding to the region C (S5 and S6).

In S5, the calculating unit 13 calculates a summation BLCc of the emission brightness of the sub surface light sources in the region C. When the target position Pn shown in FIG. 4 is set, as expressed by Equation 5, a summation of 16 subsurface light sources represented by coordinates (1, 5), (1, 6) to (5, 6), (1, 7) to (5, 7), and (1, 8) to (5, 8) is calculated.

$$BLCc=30+30+30+30+30+30+30+30+30+30+30+30+\\30+30+30+30=480 \quad \text{(Equation 5)}$$

In S6, the calculating unit 13 calculates a corresponding brightness Sc of light emitted by the group corresponding to the region C by multiplying the summation BLCc calculated in S5 by a corresponding attenuation coefficient βc of light emitted by the group. Since a method of determining the corresponding attenuation coefficient βc is similar to the method of determining the corresponding attenuation coefficient βb, a description thereof will be omitted.

$$Sc=\beta c \times BLCc=480\beta c \quad \text{(Equation 6)}$$

Subsequently, the calculating unit 13 calculates corresponding brightness of light emitted by the group corresponding to the region D (S7 and S8).

In S7, the calculating unit 13 calculates a summation BLCd of the emission brightness of the sub surface light sources in the region D. When the target position Pn shown in FIG. 4 is set, as expressed by Equation 7, a summation of 20 subsurface light sources represented by coordinates (6, 1) to (10, 1), (6, 2) to (10, 2), (6, 3) to (10, 3), and (6, 4) to (10, 4) is calculated.

$$BLCd=10+10+10+10+10+10+10+10+10+10+100+\\10+70+10+10+100+10+10+80+10=510 \quad \text{(Equation 7)}$$

In S8, the calculating unit 13 calculates a corresponding brightness Sd of light emitted by the group corresponding to the region D by multiplying the summation BLCd calculated in S7 by a corresponding attenuation coefficient βd of light emitted by the group. Since a method of determining the corresponding attenuation coefficient βd is similar to the method of determining the corresponding attenuation coefficient βb, a description thereof will be omitted.

$$Sd=\beta d \times BLCd=510\beta d \quad \text{(Equation 8)}$$

Subsequently, the calculating unit 13 calculates corresponding brightness of light emitted by the group corresponding to the region E (S9 and S10).

In S9, the calculating unit 13 calculates a summation BLCe of the emission brightness of the sub surface light sources in the region E. When the target position Pn shown in FIG. 4 is set, as expressed by Equation 9, a summation of 20 subsurface light sources represented by coordinates (6, 5) to (10, 5), (6, 6) to (10, 6), (6, 7) to (10, 7), and (6, 8) to (10, 8) is calculated.

$$BLCe=40+10+10+10+10+30+35+35+30+30+30+30+\\30+30+30+30+30+30+30+30=540 \quad \text{(Equation 9)}$$

In S10, the calculating unit 13 calculates a corresponding brightness Se of light emitted by the group corresponding to the region E by multiplying the summation BLCe calculated in S9 by a corresponding attenuation coefficient βe of light emitted by the group. Since a method of determining the corresponding attenuation coefficient βe is similar to the method of determining the corresponding attenuation coefficient βb, a description thereof will be omitted.

$$Se=\beta e \times BLCe=540\beta e \quad \text{(Equation 10)}$$

Subsequently, the calculating unit 13 calculates the final estimated brightness of the target position (S11). Specifically, the calculating unit 13 calculates a summation of brightness Sa, Sb, Sc, Sd, and Se calculated in S2, S4, S6, S8, and S10 as a final estimated brightness Lp.

$$Lp=Sa+Sb+Sc+Sd+Se \quad \text{(Equation 11)}$$

Figure 6:
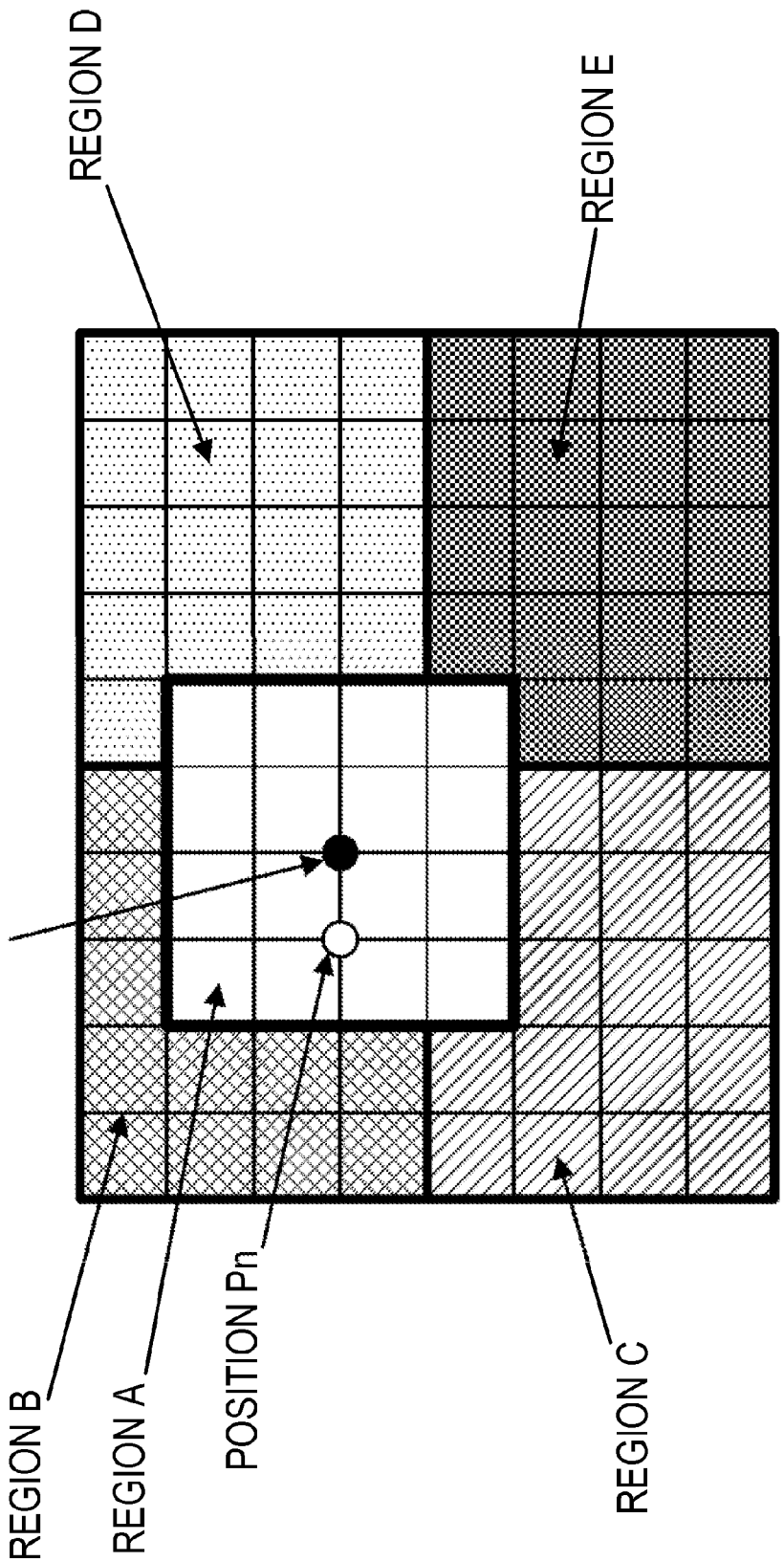
FIG. 6 is a diagram showing an example of a relationship between sub surface light sources and groups according to the first embodiment.

Next, the calculating unit 13 judges whether or not final estimated brightness has been calculated for all positions set as target positions (S12). When there are positions for which the final estimated brightness has not been calculated, processing is returned to S1. Subsequently, the processing of S1 to S11 is repeated until final estimated brightness is calculated for all positions set as target positions. After the final estimated brightness is calculated for the target position shown in FIG. 4, a position Pn+1 shown in FIG. 6 is set as a target position and final estimated brightness is calculated for the target position Pn+1. As shown in FIG. 6, when the target position is shifted to the right in the horizontal direction, the region A is similarly shifted to the right in the horizontal direction. As a result, the regions B to E are also updated as the target position is updated.

Hereinafter, final estimated brightness obtained by the method according to the present embodiment (the processing flow shown in FIG. 5) will be compared with final estimated brightness obtained by a conventional method. In this case, as the conventional method, a method will be considered in which corresponding brightness of light from each sub surface light source is calculated and a total value of the corresponding brightness of the respective sub surface light sources is calculated as the final estimated brightness. While such conventional methods are capable of calculating final estimated brightness with high accuracy, an enormous amount of computations is required.

Examples of corresponding attenuation coefficients of respective sub surface light sources when the position Pn shown in FIG. 4 is set as the target position are shown in FIG. 7. The corresponding attenuation coefficient of the sub surface light source represented by coordinates (1, 1) is a ratio of corresponding brightness to peak brightness (for example, brightness at a center position of the sub surface light source represented by coordinates (1, 1)) when only the sub surface light source is lighted. In the example shown in FIG. 7, the corresponding attenuation coefficient of the sub surface light source represented by the coordinates (1, 1) is 0.6181. This means that the brightness of light from the sub surface light source represented by the coordinates (1, 1) is to be reduced by 38.19% (=(1−0.6181)×100%) before the light reaches the target position. In other words, only 61.81% of light from the sub surface light source represented by the coordinates (1, 1) reaches the target position. The attenuation coefficient can be restated as a coefficient representing a relationship between a distance from a light source and propagance (or a carry-over factor) of light.

With the conventional method, as expressed by Equation 12, the final estimated brightness Lp can be calculated based on the corresponding attenuation coefficient shown in FIG. 7 and the control value shown in FIG. 3 as 1273.396. In Equation 12, n denotes the number of a sub surface light source, β(n) denotes a corresponding attenuation coefficient of the sub surface light source n, and BLC(n) denotes a control value (emission brightness) of the sub surface light source n. In this case, it is assumed that numerals 1 to N are assigned to the plurality of sub surface light sources that constitutes a surface light source (N is the total number of sub surface light sources). For example, in the example shown in FIG. 4, numerals 1 to 80 are assigned to the 80 sub surface light sources.

[Expression 1]

$$Lp = \sum_{n=1}^{N} \beta(n) \times BLC(n) \qquad \text{(Equation 12)}$$

In the present embodiment, the corresponding attenuation coefficients of the regions B to E are calculated based on the corresponding attenuation coefficients shown in FIG. 7. The corresponding attenuation coefficient βb of the region B is 0.6882, the corresponding attenuation coefficient βc of the region C is 0.6041, the corresponding attenuation coefficient βd of the region D is 0.5160, and the corresponding attenuation coefficient βe of the region E is 0.4396. Therefore, the corresponding brightness Sb to Se of light from the four groups corresponding to the regions B to E are calculated as follows using Equations 3, 6, 8, and 10.

$Sb=0.6883\times80=55.064$ $Sc=0.6041\times480=289.968$ $Sd=0.5161\times510=263.211$ $Se=0.4397\times510=237.438$ In addition, the summation Sa of the region A is calculated as follows by substituting the corresponding attenuation coefficients shown in FIG. 7 into Equation 1.

$Sa=393.289$

Furthermore, the final estimated brightness Lp is calculated as follows using Equation 11.

$Lp=393.289+55.064+289.968+263.211+237.438=1238.970$

Therefore, a difference between the final estimated brightness obtained by the conventional method and the final estimated brightness obtained by the method according to the present embodiment is (1273.396−1238.970)/1273.396× 100=2.70%. This shows that the method according to the present embodiment is capable of producing a result that is approximately similar to that produced by the conventional method (a method that accurately calculates final estimated brightness but requires an enormous amount of computing). In other words, it is shown that final estimated brightness can also be accurately calculated by the method according to the present embodiment. In addition, with the method according to the present embodiment, when sectioning the plurality of sub surface light sources into a plurality of groups, sub surface light sources that are outside of a predetermined range from the target position are sectioned more roughly than sub surface light sources that are inside of the predetermined range from the target position. Therefore, with the method according to the present embodiment, the amount of computations required to calculate final estimated brightness can be reduced. As described above, with the method according to the present embodiment, final estimated brightness can be accurately calculated with a small amount of computations.

Figure 8:
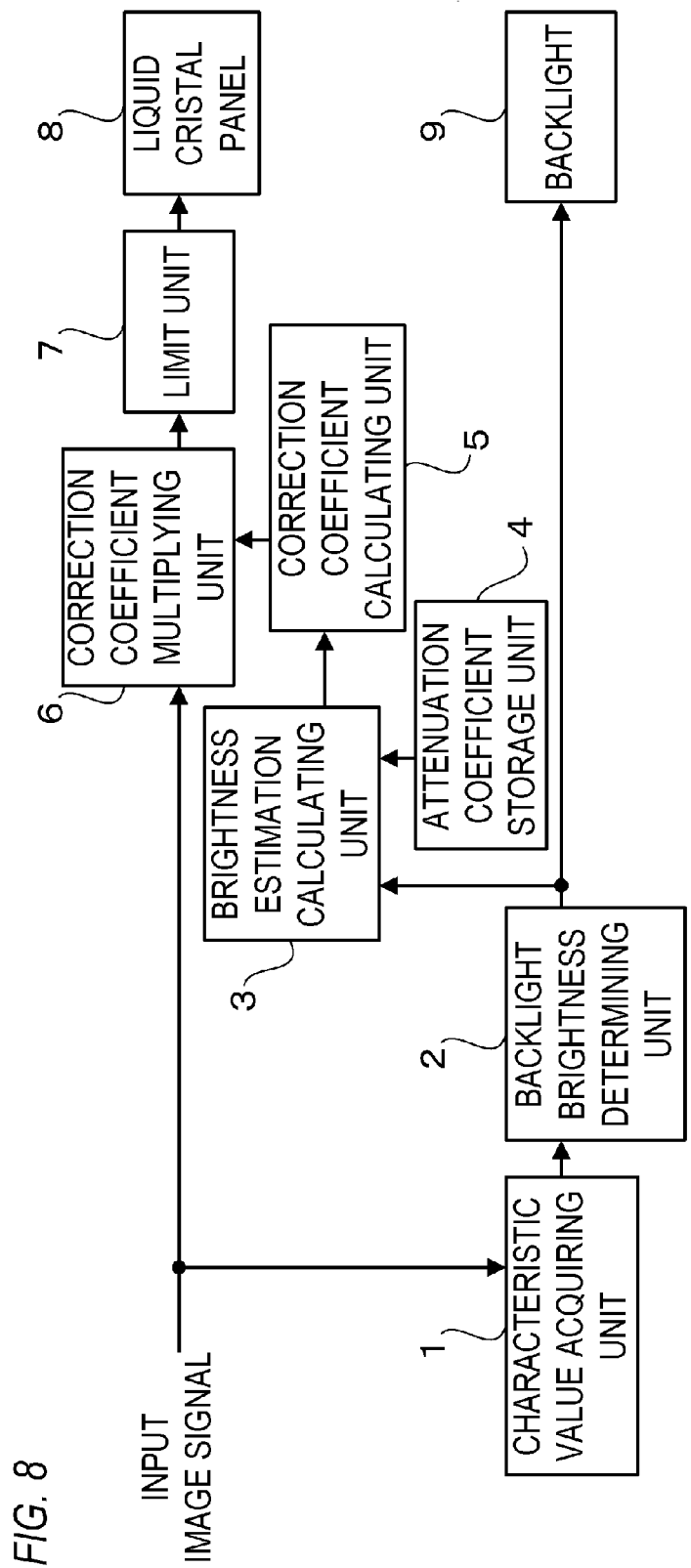
FIG. 8 is a block diagram showing an example of a functional configuration of a display apparatus according to a first embodiment.

FIG. 8 is a block diagram showing an example of a functional configuration of a display apparatus according to the present embodiment.

As shown in FIG. 8, the display apparatus according to the present embodiment has a characteristic value acquiring unit 1, a backlight brightness determining unit 2, a brightness estimation calculating unit 3, an attenuation coefficient storage unit 4, a correction coefficient calculating unit 5, a correction coefficient multiplying unit 6, a limit unit 7, a liquid crystal panel 8, a backlight 9, and the like. Moreover, while an example where the display apparatus is a liquid crystal display apparatus will be described in the present embodiment, the display apparatus is not limited to a liquid crystal display apparatus. The display apparatus may be any display apparatus having an independent light source.

The characteristic value acquiring unit 1 acquires a characteristic value of input image data (an input image signal) for each sub surface light source (each region indicated by dashed lines in FIG. 2). The characteristic value is a representative value or a histogram of pixel values (RGB values or the like), brightness values, or the like. The representative value is an average value, a mode value, a maximum value, a minimum value, an intermediate value, or the like. In the pre sent embodiment, it is assumed that an average value of RGB values is acquired as a characteristic value. Moreover, one characteristic value or a plurality of characteristic values may be acquired for one sub surface light source. The characteristic value may be acquired (detected) by analyzing an image or acquired from the outside.

The backlight brightness determining unit 2 determines (sets) emission brightness (a control value) of each sub surface light source based on the characteristic value of each sub surface light source acquired by the characteristic value acquiring unit 1. In the present embodiment, the emission brightness of each sub surface light source is determined so that a sub surface light source in a region where a dark image (an image with low average brightness) is displayed has low emission brightness and a sub surface light source in a region where a bright image (an image with a high average brightness) is displayed has high emission brightness.

The brightness estimation calculating unit 3 is the brightness calculating apparatus shown in FIG. 1. The attenuation coefficient used when calculating final estimated brightness and the attenuation coefficient used in the calculation shown in FIG. 5 are stored in the attenuation coefficient storage unit 4. The brightness estimation calculating unit 3 calculates final estimated brightness by reading a necessary attenuation coefficient from the attenuation coefficient storage unit 4 based on the emission brightness of each sub surface light source determined by the backlight brightness determining unit 2. The attenuation coefficient storage unit 4 stores attenuation coefficients at respective positions on the emission surface of the backlight for each sub surface light source.

Moreover, the attenuation coefficient storage unit 4 may store attenuation coefficients at respective positions on the emission surface of the backlight for each group. Adopting such a configuration eliminates the need to calculate representative values of attenuation coefficients and can further reduce the amount of computations.

Alternatively, the attenuation coefficient storage unit 4 may be apart of the brightness estimation calculating unit 3 (the brightness calculating apparatus) or may be a functional unit that is separate from the brightness estimation calculating unit 3.

Alternatively, the brightness estimation calculating unit 3 may acquire corresponding attenuation coefficients from a functional unit other than the attenuation coefficient storage unit 4.

Based on the final estimated brightness at each position calculated by the brightness estimation calculating unit 3, the correction coefficient calculating unit 5 calculates a correction coefficient of an input image signal for adjusting the brightness on the screen to a target value for each pixel. In the present embodiment, the correction coefficient is calculated using Equation 12. In Equation 12, Lpn denotes final estimated brightness at a given pixel position (target pixel position). Lt denotes a target value of brightness on the screen, and Gpn denotes a correction coefficient at the target pixel position.

$$Gpn=Lt/Lpn \quad \text{(Equation 12)}$$

Moreover, the target value Lt may be set for each sub surface light source or a single target value Lt may be set for the entire screen.

When the final estimated brightness of the target pixel position has not been calculated, weighting may be performed in accordance with distances from the target pixel position on a plurality of final estimated brightness corresponding to a plurality of positions around the target pixel position and the plurality of weighted final estimated brightness may be composited. Accordingly, the final estimated brightness of the target pixel position can be calculated.

When the final estimated brightness of the target pixel position has not been calculated, the final estimated brightness at a position closest to the target pixel position among positions where final estimated brightness has been calculated may be used as the final estimated brightness of the target pixel position.

The correction coefficient multiplying unit 6 generates a corrected image signal for each pixel by multiplying the input image signal by the correction coefficient calculated by the correction coefficient calculating unit 5.

When a pixel value of the corrected image signal generated by the correction coefficient multiplying unit 6 is a value that is outside of an input range of the liquid crystal panel 8, the limit unit 7 limits the pixel value to values inside the input range (limiting process).

The liquid crystal panel 8 is a display panel (display unit) having a plurality of liquid crystal elements. In addition, the liquid crystal panel 8 has a liquid crystal driver which controls transmittances of the plurality of liquid crystal elements and a control board which drives the liquid crystal driver. The corrected image signal after the limiting process is inputted to the control board. Based on the corrected image signal after the limiting process, the control board drives the liquid crystal driver so that the transmittances of the plurality of liquid crystal elements are adjusted to transmittances in accordance with the corrected image signal after the limiting process.

The backlight 9 is a surface light source (light source unit) which has a plurality of sub surface light sources whose emission brightness can be individually controlled. Each sub surface light source has alight source (for example, an LED), a control circuit which drives the light source, an optical unit which diffuses light from the light source, and the like. The backlight 9 emits light at the emission brightness determined by the backlight brightness determining unit 2 for each sub surface light source. Specifically, for each sub surface light source, a corresponding control value is inputted to the control circuit of the sub surface light source. In addition, with each sub surface light source, the control circuit of the sub surface light source emits light from the light source of the sub surface light source at emission brightness corresponding to the inputted control value.

Moreover, the control circuit and the optical unit may be a member that is shared by a plurality of sub surface light sources.

As described above, according to the present embodiment, when sectioning a plurality of sub surface light sources into a plurality of groups, sub surface light sources that are outside of a predetermined range from the target position are sectioned more roughly than sub surface light sources that are inside of the predetermined range from the target position. In addition, a total value of brightness of light from the respective groups at the target position is assumed to be the final estimated brightness. Accordingly, the brightness at each position on an emission surface of a surface light source including a plurality of sub surface light sources can be accurately calculated with a small amount of computations.

Furthermore, since an image signal inputted to a liquid crystal panel is corrected based on calculation results of brightness at respective positions on the emission surface of a backlight (a surface light source including a plurality of sub surface light sources), an accurate gradation expression can be produced and contrast can be enhanced in a preferable manner.

Moreover, while an example of a case having 80 sub surface light sources arranged in eight rows and ten columns has been described in the present embodiment, the number of sub surface light sources is not limited to this example. The number of sub surface light source may be larger or smaller than 80. When the predetermined range described earlier is constant, the larger the number of the sub surface light sources, the smaller the relative amount of computations as compared to conventional methods.

Moreover, while a total of 16 sub surface light sources arranged in four rows and four columns which are closest to the target position are assumed to be sub surface light sources inside a predetermined range from the target position in the present embodiment, the sub surface light sources inside the predetermined range from the target position are not limited thereto. For example, a total of four sub surface light sources arranged in two rows and two columns which are closest to the target position may be assumed to be sub surface light sources inside the predetermined range from the target position. A total of 25 subsurface light sources arranged in five rows and five columns which are closest to the target position may be assumed to be sub surface light sources inside the predetermined range from the target position. A total of 8 sub surface light sources arranged in two rows and four columns which are closest to the target position may be assumed to be sub surface light sources inside the predetermined range from the target position. Sub surface light sources with a distance between the target position and a position of the sub surface light source (for example, center positions thereof) that is equal to or smaller than a threshold may be assumed to be sub surface light sources inside the predetermined range from the target position.

Figure 9:
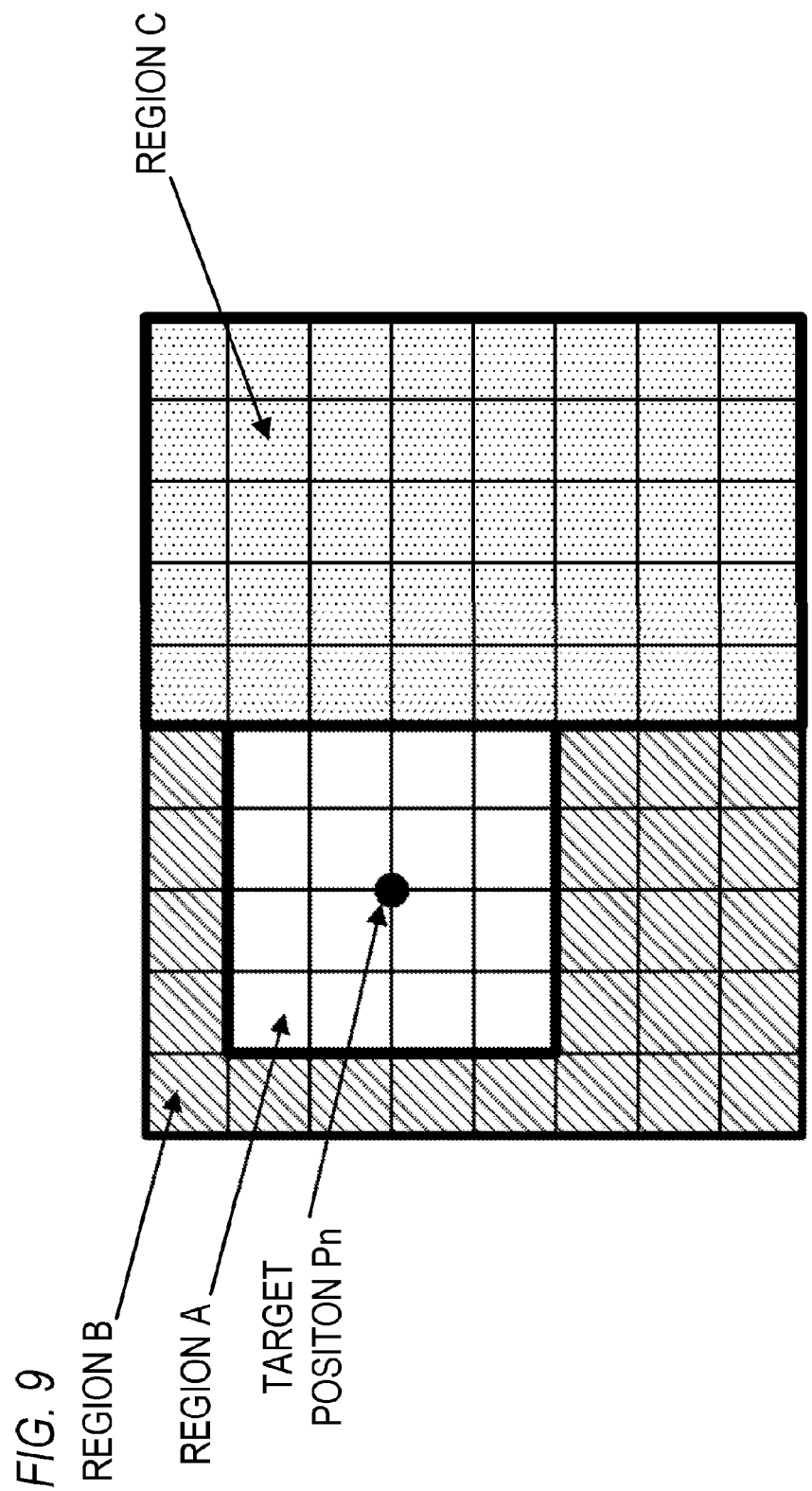
FIG. 9 is a diagram showing an example of a divided region according to the first embodiment.
Figure 10:
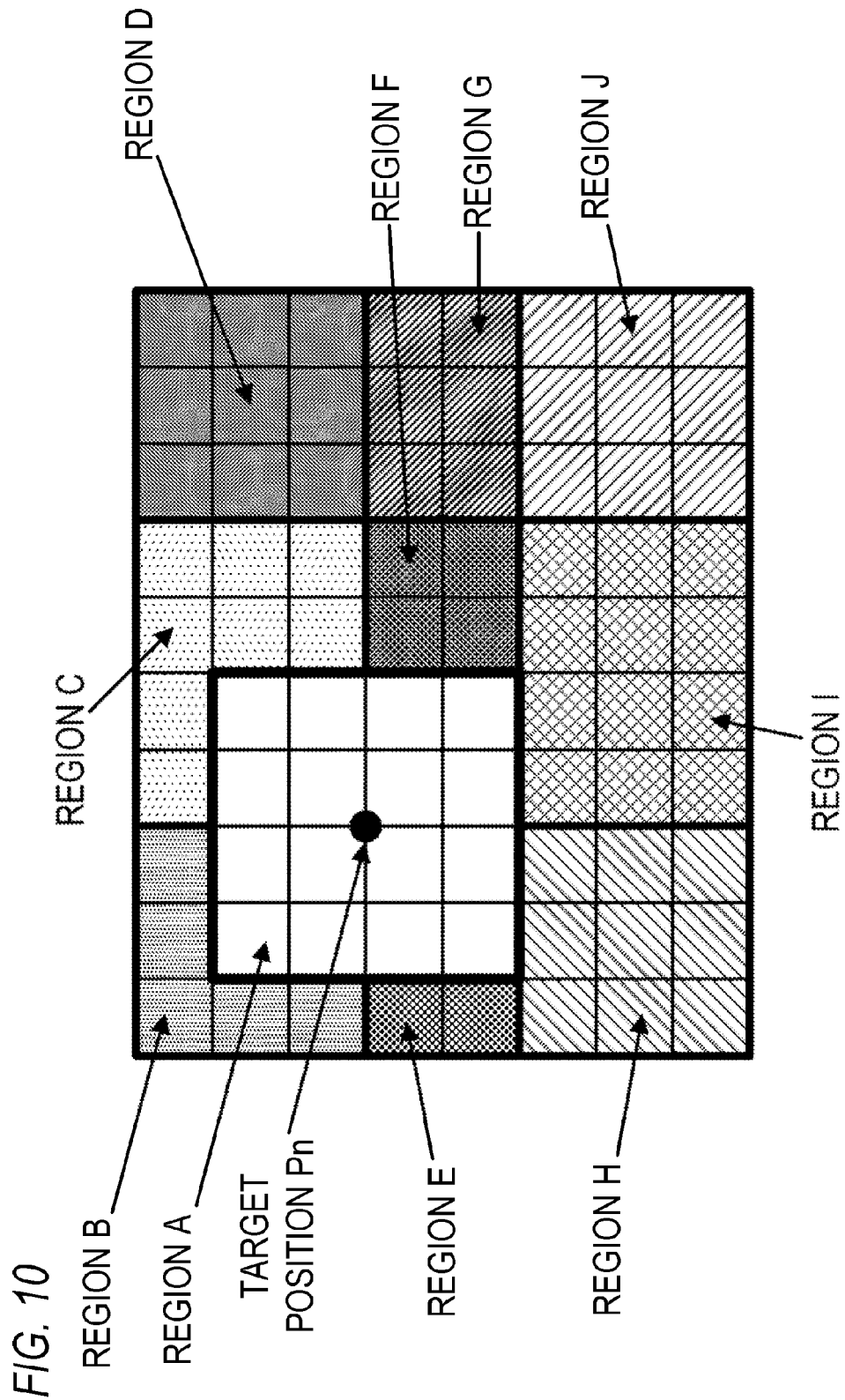
FIG. 10 is a diagram showing an example of a divided region according to the first embodiment.

Moreover, in the present embodiment, a plurality of divided regions determined in advance is set as the plurality of divided regions. Specifically, four regions which are arranged in two rows and two columns and which are obtained by dividing the emission surface of the backlight based on a center position of the emission surface are set as the plurality of divided regions. However, the plurality of divided regions is not limited thereto. For example, as shown in FIG. 9, the plurality of divided regions may be two regions which are arranged in one row and two columns and which are obtained by dividing the emission surface of the backlight based on the center position of the emission surface. As shown in FIG. 10, the plurality of divided regions may be nine regions which are arranged in three rows and three columns and which are obtained by dividing the emission surface of the backlight based on the center position of the emission surface. The plurality of divided regions need not necessarily be regions obtained by dividing the emission surface of the backlight based on the center position of the emission surface. In addition, the number and sizes of the divided regions are not limited to those described above.

Figure 11:
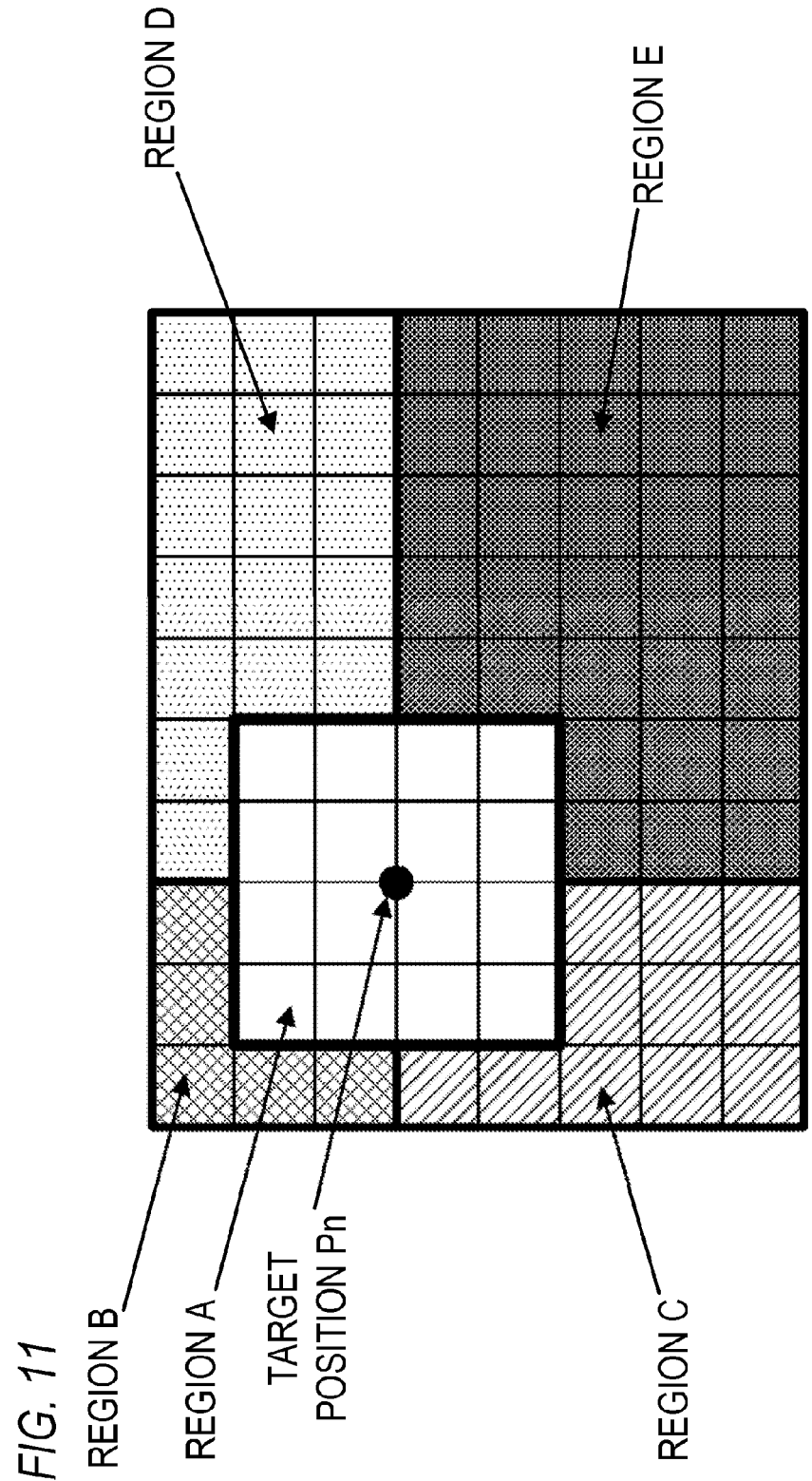
FIG. 11 is a diagram showing an example of a divided region according to the first embodiment.
Figure 12:
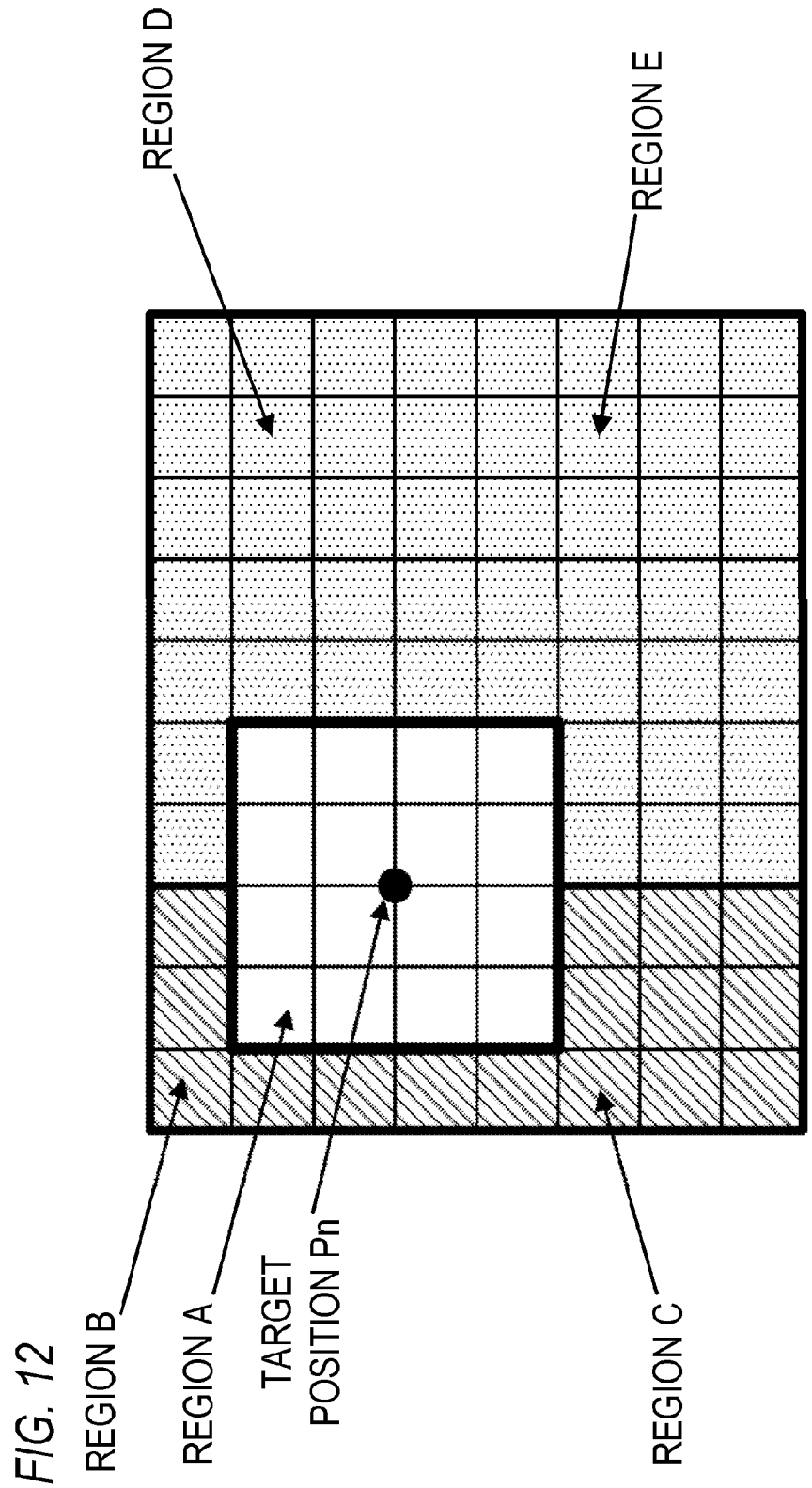
FIG. 12 is a diagram showing an example of a divided region according to the first embodiment.

Furthermore, a plurality of divided regions may be set for each position on the emission surface. For example, as shown in FIGS. 11 and 12, the plurality of divided regions may be obtained by dividing the emission surface in a matrix pattern based on the target position. FIG. 11 shows an example of a case where four divided regions arranged in two rows and two columns are set, and FIG. 12 shows an example of a case where two divided regions arranged in one row and two columns are set. The number and sizes of the divided regions are not limited to those shown in FIGS. 11 and 12. By setting a plurality of regions obtained by dividing the emission surface in a matrix pattern based on the target position as the plurality of divided regions, light from a sub surface light source positioned away from the target position can be considered on the same basis regardless of the target position. As a result, a variation in accuracy of the final estimated brightness of the respective positions can be reduced.

Alternatively, divided regions need not be set. Sub surface light sources outside of a predetermined range from the target position may be sectioned in any way as long as the sub surface light sources outside of the predetermined range from the target position are more roughly sectioned than the sub surface light sources inside of the predetermined range from the target position.

Moreover, while final estimated brightness can be calculated with higher accuracy by increasing the number of groups, this results in an increase in the amount of computations. Therefore, the number of groups (the number of sub surface light sources constituting a group inside of a predetermined range from the target position, the number of sub surface light sources constituting a group outside of the predetermined range from the target position, the number of divided regions, and the like) may be determined according to necessary processing time, processing accuracy, and the like.

Moreover, while an example of a case where the surface light source is a backlight of a display apparatus has been described in the present embodiment, the surface light source is not limited thereto. The surface light source is not limited to that used in a display apparatus and may be, for example, a lighting apparatus used indoors or outdoors.

Second Embodiment

Hereinafter, a brightness calculating apparatus, a control method for the brightness calculating apparatus, and a display apparatus according to a second embodiment of the present invention will be described with reference to the drawings. Note that descriptions of functions and the like similar to those of the first embodiment will be omitted.

In the first embodiment, an example of a case was described in which attenuation coefficients at respective positions where final estimated brightness is calculated are stored in advance in a storage apparatus (the attenuation coefficient storage unit 4) for each sub surface light source. In the present embodiment, an example of a case will be described in which attenuation information (a table or a function) indicating a relationship between distances from a light source and attenuation rates is stored in advance in a storage apparatus (the attenuation coefficient storage unit 4). In the present embodiment, a corresponding attenuation coefficient of each group is calculated by obtaining a distance between a target position and the group or a distance between the target position and a sub surface light source. Accordingly, with the present embodiment, a capacity of data stored in the storage apparatus can be reduced as compared to the first embodiment. Specifically, while the first embodiment requires data of an attenuation coefficient for each sub surface light source, a single table (or a function) need only be prepared in the present embodiment. Therefore, with the present embodiment, the capacity of data stored in the storage apparatus can be reduced as compared to the first embodiment.

Moreover, a method of calculating corresponding brightness of each group and a method of calculating final estimated brightness of a target position are the same as those of the first embodiment. In addition, an attenuation coefficient can be restated as a coefficient representing a relationship between a distance from a light source and propagance (or a carry-over factor) of light.

A functional configuration of the brightness calculating apparatus according to the present embodiment is the same as that of the first embodiment (FIG. 1).

Figure 13:
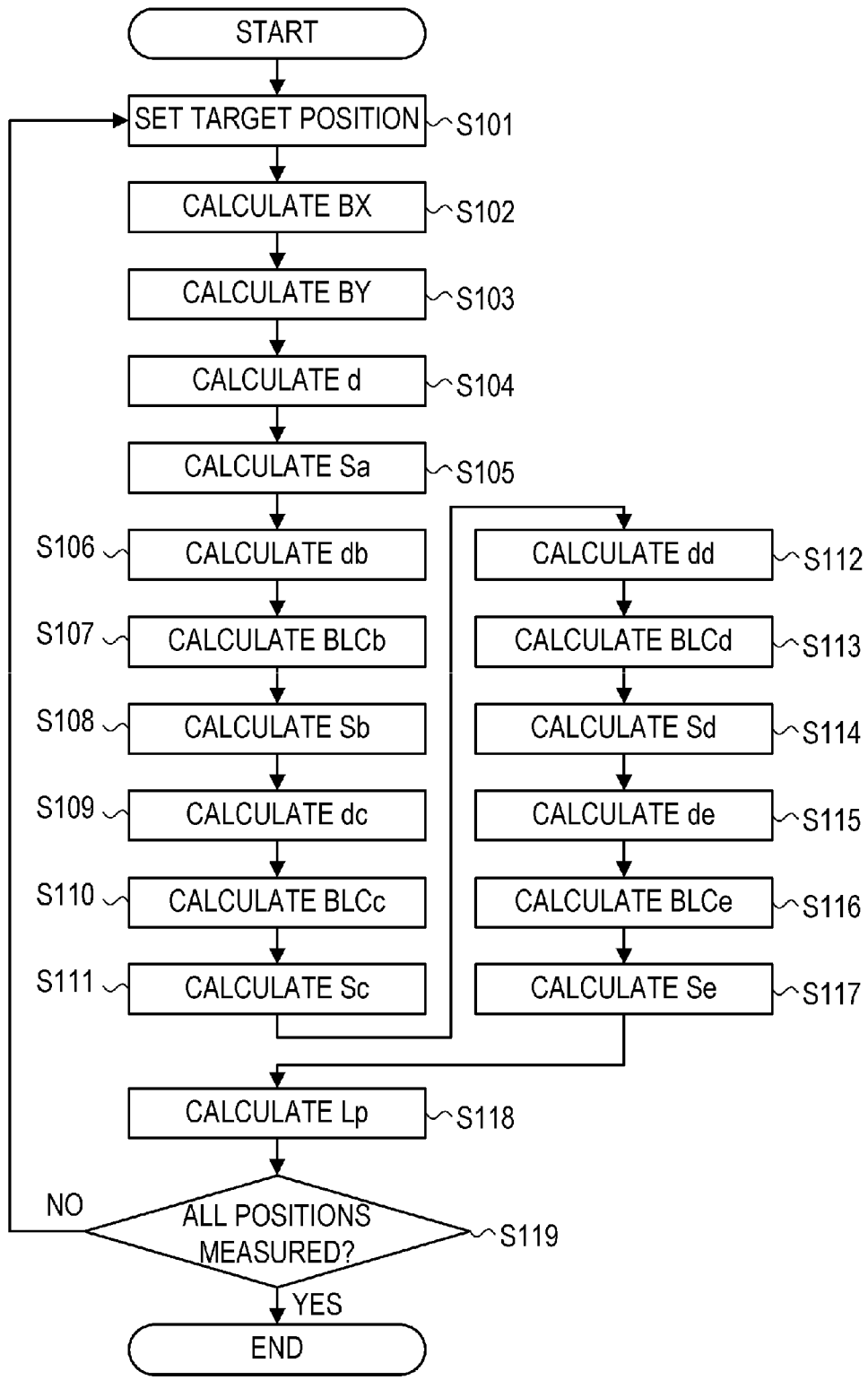
FIG. 13 is a flow chart showing an example of a processing flow of the brightness calculating apparatus according to the second embodiment.

FIG. 13 shows an example of a processing flow when the brightness calculating apparatus according to the present embodiment calculates final estimated brightness.

First, the setting unit 11 sets a target position. Subsequently, the sectioning unit 12 sections a plurality of sub surface light sources into a plurality of groups based on the set target position (S101). The process of S101 is the same as the process of S1 in FIG. 5. In this case, let us assume that the target position Pn shown in FIG. 4 has been set. Let us also assume that a plurality of sub surface light sources has been sectioned into a plurality of groups as shown in FIG. 4. Specifically, one sub surface light source is set as one group in the region A, and all sub surface light sources in a region are set as one group in each of the regions B to E.

Next, the calculating unit 13 obtains, for each sub surface light source, a horizontal distance between a position of the sub surface light source (for example, a center position thereof) and the target position (S102). A horizontal distance between a position of a sub surface light source represented by coordinates (x, y) and the target position will be denoted as BX(x, y).

Figure 14:
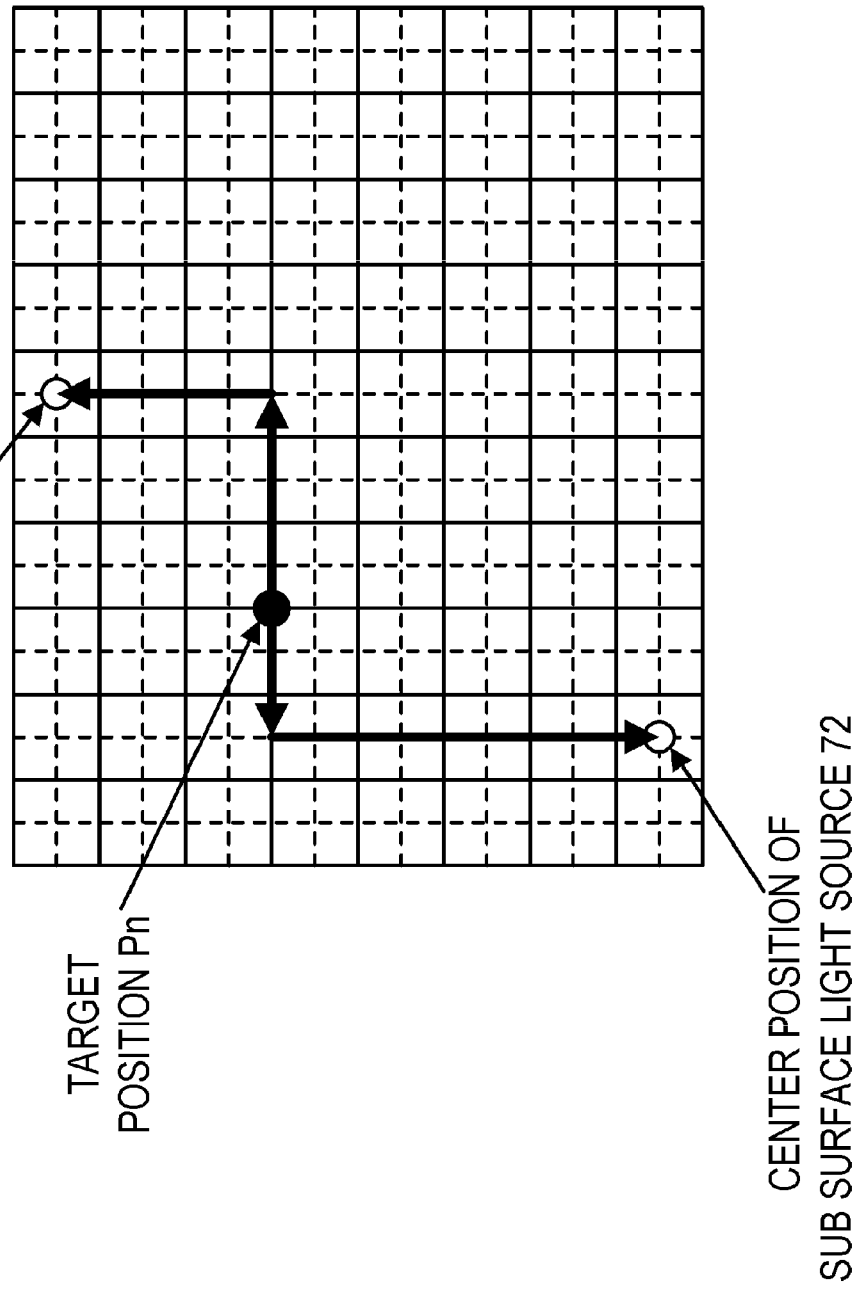
FIG. 14 is a diagram showing a specific example of a method of determining a horizontal distance and a vertical distance according to a second embodiment.

A specific example of a method of determining the distance BX(x, y) will be described with reference to FIG. 14. Regions depicted by solid lines in FIG. 14 correspond to sub surface light sources. Dashed lines in FIG. 14 depict center lines of the sub surface light sources in the horizontal and vertical directions.

An example of determining a distance BX(6, 1) between the target position Pn and a sub surface light source 6 at coordinates (6, 1) and a distance BX(2, 8) between the target position Pn and a sub surface light source 72 at coordinates (2, 8) will be described.

In the present embodiment, it is assumed that every time the distance from the target position Pn increases in the horizontal direction by ½ of a horizontal size of the sub surface light source (a spacing between solid lines and dashed lines), a value of the distance BX(x, y) increases by 1. If sizes of the respective sub surface light sources are uniform, the spacing between solid lines and dashed lines is uniform. In the example shown in FIG. 14, the horizontal distance BX(6, 1) between the target position Pn and a center position of the sub surface light source 6 is 5. The horizontal distance BX(2, 8) between the target position Pn and a center position of the sub surface light source 72 is 3.

In this manner, in S102, for each sub surface light source, a horizontal distance between the target position and the sub surface light source is obtained. In the example shown in FIG. 14, since there are 80 sub surface light sources, 80 distances are obtained.

Next, the calculating unit 13 obtains, for each sub surface light source, a vertical distance between the position of the sub surface light source and the target position (S103). A vertical distance between the position of a sub surface light source represented by coordinates (x, y) and the target position will be denoted as BY(x, y).

A method of determining the distance BY(x, y) is similar to the method of determining the distance BX(x, y). Therefore, in the example shown in FIG. 14, the vertical distance BY(6, 1) between the target position Pn and the center position of the sub surface light source 6 is 5. The vertical distance BY(2, 8) between the target position Pn and the center position of the sub surface light source 72 is 9.

Next, the calculating unit 13 obtains, for each sub surface light source, a linear distance (a shortest distance) between the position of the sub surface light source and the target position (S104). A linear distance between the position of a sub surface light source represented by coordinates (x, y) and the target position will be denoted as d(x, y).

The linear distance d(x, y) can be obtained using the distance BX(x, y) calculated in S102 and the distance BY(x, y) calculated in S103. In the present embodiment, the linear distance d(x, y) is obtained using a look-up table (a distance calculation LUT) that represents a correspondence relationship between combinations of the distance BX and the distance BY and the linear distance d. FIG. 15 shows an example of the distance calculation LUT. The LUT shown in FIG. 15 is created in advance using Equation 13 that is based on the Pythagorean theorem. Specifically, a value obtained by rounding off a value of d produced by Equation 13 to the nearest whole number is assumed to be the value of d in the LUT.

$$d=(BX^2+BY^2)^{1/2}\times 16 \qquad\qquad\text{(Equation 13)}$$

Rounding off $(BX^2+BY^2)^{1/2}$ to the nearest whole number increases rounding error. $(BX^2+BY^2)^{1/2}$ is multiplied by a constant (by 16) in Equation 13 in order to integrate a part of the decimals of $(BX^2+BY^2)^{1/2}$ so as to reduce the rounding error. Moreover, the constant is not limited to 16. Alternatively, 8, 10, 20, or the like may be used.

Moreover, the distance d (x, y) may be calculated using Equation 13 without using the LUT.

Figure 16:
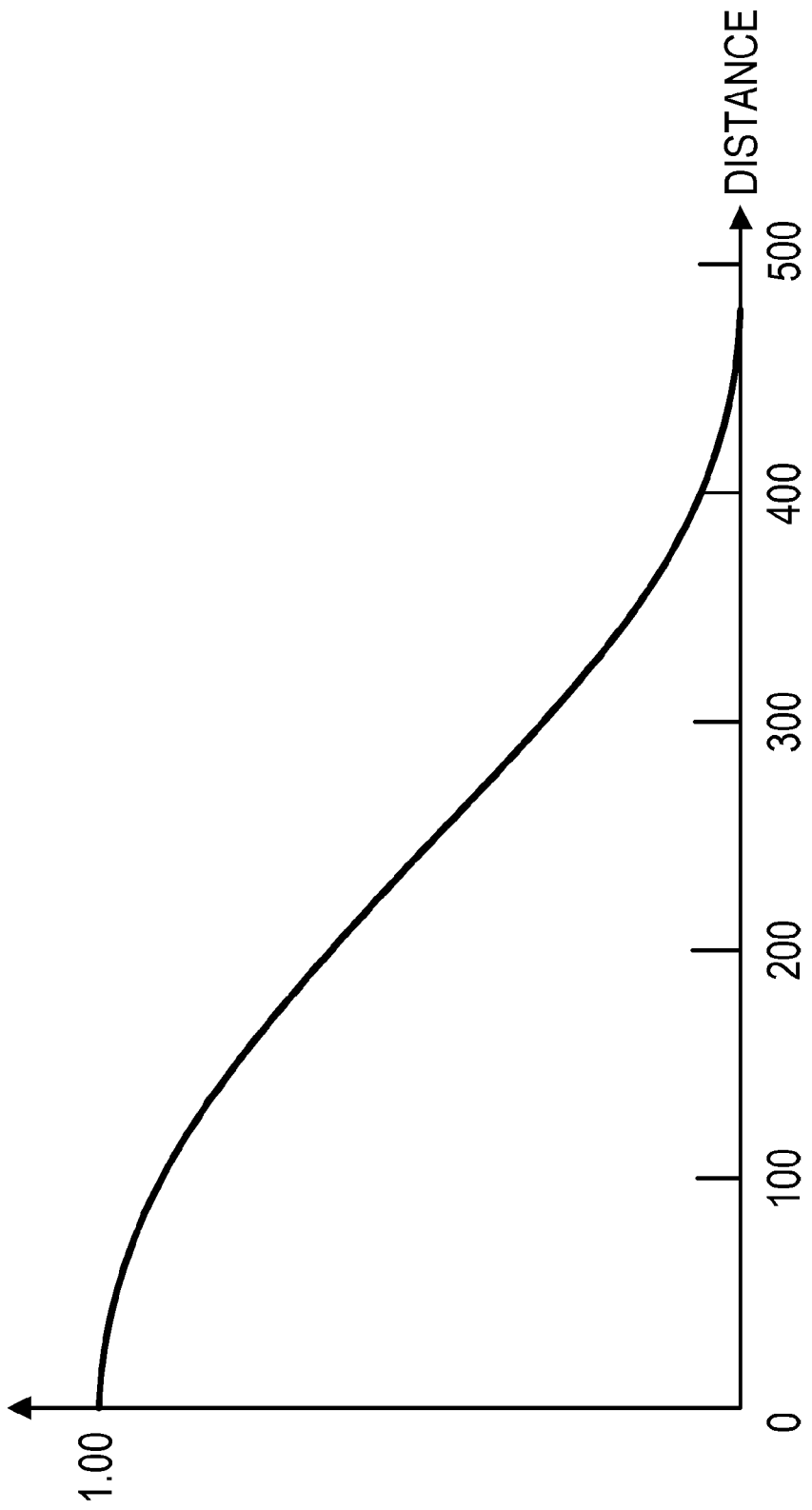
FIG. 16 is a diagram showing an example of an attenuation function according to the second embodiment.

Next, the calculating unit 13 calculates a summation Sa of corresponding brightness of light emitted by the groups (sub surface light sources) in the region A (S105). Specifically, for each sub surface light source in the region A (each group in the region A), a corresponding attenuation coefficient β(x, y) of light emitted by the sub surface light source is calculated using the linear distance d(x, y) between the position of the sub surface light source and the target position and attenuation information (an attenuation function). The linear distance d(x, y) is the value obtained in S104. Subsequently, in a similar manner to S2 in the first embodiment, a summation Sa is calculated based on the corresponding attenuation coefficient and the emission brightness (control value) of each sub surface light source in the region A. An example of an attenuation function is shown in FIG. 16. In FIG. 16, an abscissa represents distances and an ordinate represents attenuation coefficients.

Next, the calculating unit 13 obtains a linear distance between the position of the region B (a group corresponding to the region B) and the target position (S106). Specifically, an average value db of linear distances d(x, y) between positions of sub surface light sources in the region B and the target position is calculated as the linear distance between the position of the region B and the target position. The average value db can be calculated by dividing a summation of the linear distances d(x, y) between the positions of sub surface light sources in the region B and the target position by the number of sub surface light sources in the region B. As described above, in the present embodiment, with groups including a plurality of sub surface light sources such as the group corresponding to the region B, an average value of distances between respective positions of the plurality of sub surface light sources and the target position is calculated as the distance between the position of the group and the target position.

Moreover, a method of determining a distance (a linear distance) between a position of a group including a plurality of sub surface light sources and the target position is not limited to the method described above. For example, the position (a center position or a barycentric position) of a group may be identified from positions of respective sub surface light sources in the group and a linear distance between the identified position and the target position may be obtained by processing similar to that of S102 to S104. However, adopting the average value as the linear distance eliminates the need to identify the position of a group and enables processing load to be reduced.

In addition, the calculating unit 13 calculates a summation BLCb of the emission brightness of the subsurface light sources in the region B in a similar manner to S3 in the first embodiment (S107).

Subsequently, the calculating unit 13 calculates a corresponding brightness Sb of light emitted by the group corresponding to the region B in a similar manner to S4 in the first embodiment (S108). Moreover, the corresponding attenuation coefficient βb used to calculate the corresponding brightness Sb is calculated based on the linear distance (the average value db) calculated in S106 and the attenuation function (the attenuation function used in S105).

Subsequently, processing of S109 to S117 is performed.

In S109 to S111, a linear distance (an average value dc) between a position of the region C (a group corresponding to the region C) and the target position, a summation BLCc, and a corresponding brightness Sc are calculated by processing similar to that of S106 to S108.

In S112 to S114, a linear distance (an average value dd) between a position of the region D (a group corresponding to the region D) and the target position, a summation BLCd, and a corresponding brightness Sd are calculated by processing similar to that of S106 to S108.

In S115 to S117, a linear distance (an average value de) between a position of the region E (a group corresponding to the region E) and the target position, a summation BLCe, and a corresponding brightness Se are calculated by processing similar to that of S106 to S108.

After S117, the calculating unit 13 calculates a summation of Sa, Sb, Sc, Sd, and Se calculated in S101 to S116 as a final estimated brightness Lp with respect to the target position (S118).

Next, the calculating unit 13 judges whether or not final estimated brightness has been calculated for all positions set as target positions (S119). When there are positions for which final estimated brightness has not been calculated, processing is returned to S101. Subsequently, the processing of S101 to S118 is repeated until final estimated brightness is calculated for all positions set as target positions.

Figure 17:
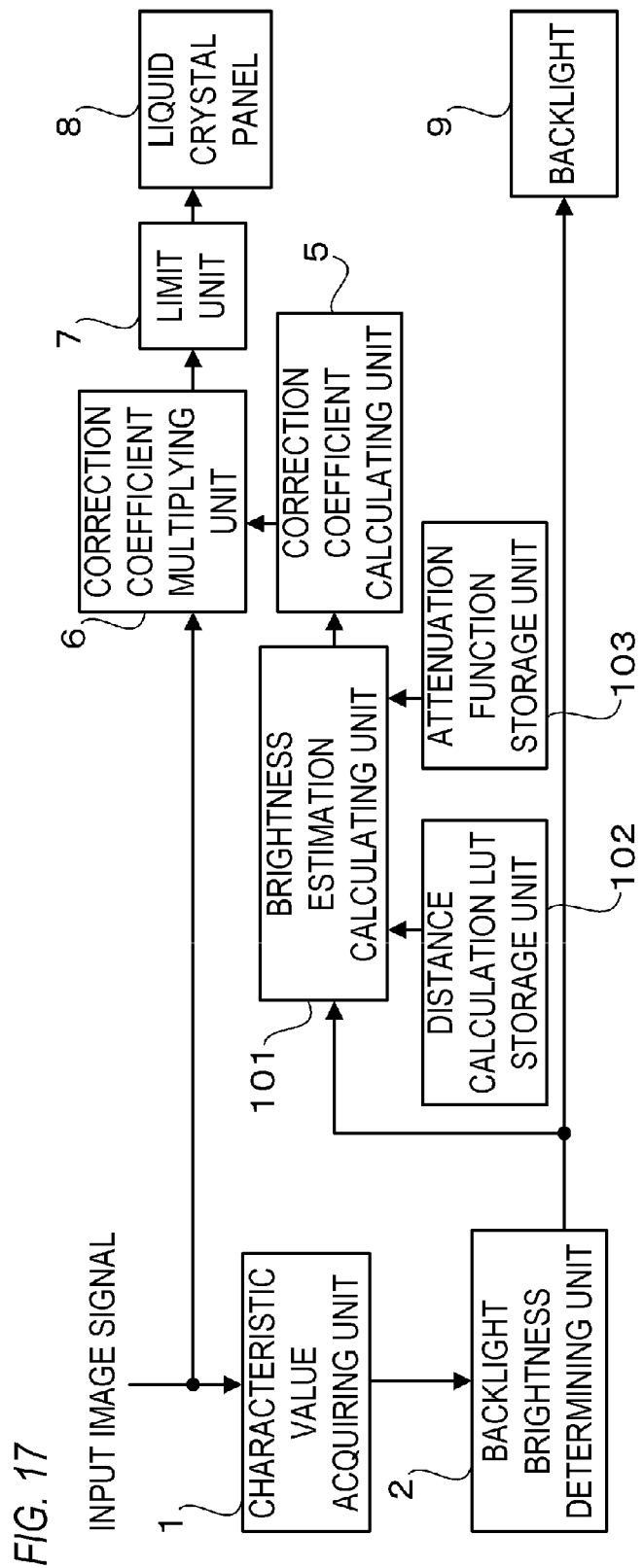
FIG. 17 is a block diagram showing an example of a functional configuration of a display apparatus according to a second embodiment.

FIG. 17 is a block diagram showing an example of a functional configuration of a display apparatus according to the present embodiment.

As shown in FIG. 17, the display apparatus according to the present embodiment has a characteristic value acquiring unit 1, a backlight brightness determining unit 2, a brightness estimation calculating unit 101, a distance calculation LUT storage unit 102, an attenuation function storage unit 103, a correction coefficient calculating unit 5, a correction coefficient multiplying unit 6, a limit unit 7, a liquid crystal panel 8, a backlight 9, and the like.

The characteristic value acquiring unit 1, the backlight brightness determining unit 2, the correction coefficient calculating unit 5, the correction coefficient multiplying unit 6, the limit unit 7, the liquid crystal panel 8, and the backlight 9 have the same functions as those of the first embodiment.

The brightness estimation calculating unit 101 is the brightness calculating apparatus according to the present embodiment and performs the processing shown in FIG. 13.

The distance calculation LUT storage unit 102 stores a distance calculation LUT (the LUT shown in FIG. 15) that is used to obtain the linear distance d in S104 shown in FIG. 13. When performing the processing of S104, the brightness estimation calculating unit 101 reads an LUT from the distance calculation LUT storage unit 102.

The attenuation function storage unit 103 stores attenuation functions used for calculating corresponding attenuation coefficients in S105, S108, S111, S114, and S117 shown in FIG. 13 (or LUTs generated from the attenuation functions (tables representing attenuation coefficients per distance)). When performing the processing of S105, S108, S111, S114, and S117, the brightness estimation calculating unit 101 reads attenuation functions from the attenuation function storage unit 103.

Alternatively, the distance calculation LUT storage unit 102 and the attenuation function storage unit 103 may be a part of the brightness estimation calculating unit 101 (the brightness calculating apparatus) or may be functional units that are separate from the brightness estimation calculating unit 101.

As described above, according to the present embodiment, a corresponding attenuation coefficient of light from each group is calculated using attenuation information that represents a relationship between distances from a light source and attenuation rates. Accordingly, the capacity of data to be stored in a storage apparatus can be reduced as compared to the first embodiment and, at the same time, an effect comparable to that produced by the configuration of the first embodiment can be produced.

Moreover, while the present embodiment adopts a configuration in which, for each group, a distance between a position of the group and a target position is obtained and, for each group, an attenuation coefficient of the group is calculated using the obtained distance of the group and attenuation information, this configuration is not restrictive. For example, for each sub surface light source, a distance between the position of the sub surface light source and the target position may be obtained, and for each sub surface light source, an attenuation coefficient of the sub surface light source may be calculated using the obtained distance of the sub surface light source and attenuation information. In this case, with a group including a single sub surface light source, the attenuation coefficient of the sub surface light source may be used as the attenuation coefficient of the group. In addition, with a group including a plurality of sub surface light sources, a representative value of attenuation coefficients of the plurality of sub surface light sources may be used as the attenuation coefficient of the group.

Third Embodiment

Hereinafter, a brightness calculating apparatus, a control method for the brightness calculating apparatus, and a display apparatus according to a third embodiment of the present invention will be described with reference to the drawings. Note that descriptions of functions and the like similar to those of the first embodiment will be omitted.

In the first embodiment, an example has been described in which among sub surface light sources in a divided region obtained by dividing an emission surface in a matrix pattern based on a center position of the emission surface or a calculation target position, all sub surface light sources that are outside of a predetermined range from the calculation target position is sectioned into a single sectioned region. However, setting sectioned regions (groups) in this manner may sometimes increase a variation in distances between positions of sub surface light sources and the calculation target position in one sectioned region. Such a large variation in distances increases error in an attenuation coefficient representative value and, by extension, increases errors in corresponding brightness and final estimated brightness.

In consideration thereof, in the present embodiment, sub surface light sources that are outside of a predetermined range from the calculation target position are sectioned into sectioned regions including a plurality of sub surface light sources with a small variation in distances to the calculation target position. Accordingly, error in an attenuation coefficient representative value can be reduced and, by extension, errors in corresponding brightness and final estimated brightness can be reduced.

Figure 18:
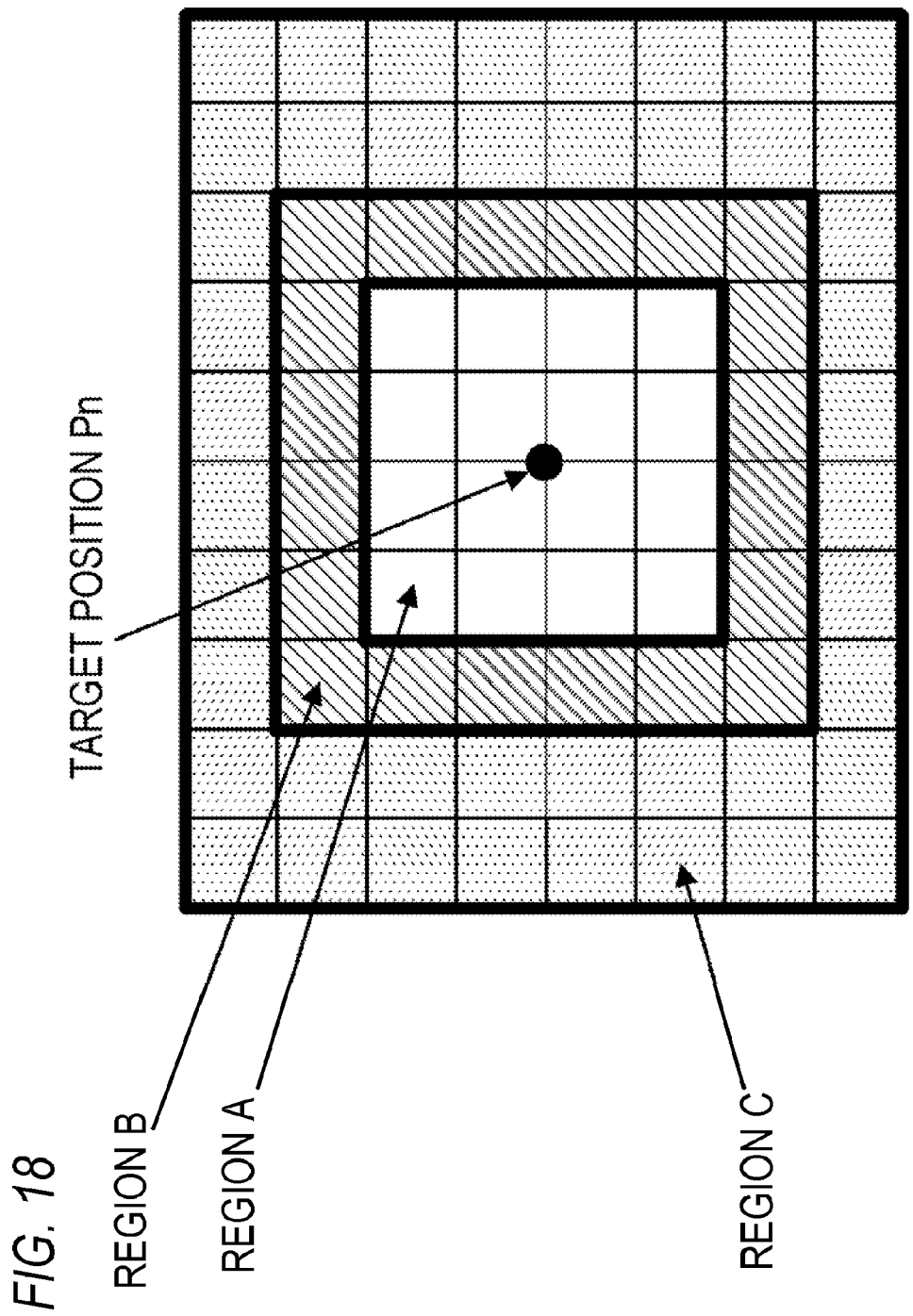
FIG. 18 is a diagram showing an example of a sectioned region according to the third embodiment.

An example of grouping (sectioning) according to the present embodiment is shown in FIG. 18.

In FIG. 18, a region A is a region for which the effect of light from sub surface light sources is finely calculated, and regions B and C are regions for which the effect of light from sub surface light sources is roughly calculated.

Since the region A is similar to that of the first embodiment, a description thereof will be omitted.

The region B is a sectioned region (group) including all (20) sub surface light sources that are adjacent to the region A. The region C is a sectioned region including all (44) sub surface light sources that are positioned outside of the region B.

In the present embodiment, as depicted in the regions B and C in FIG. 18, sub surface light sources that are outside of a predetermined range from the calculation target position are sectioned into a sectioned region including a plurality of light sources which is centered around and which encloses the calculation target position. In a sectioning region that is sectioned in this manner, a variation in distances between positions of sub surface light sources and the calculation target position becomes significantly small. Therefore, according to the present embodiment, error in an attenuation coefficient representative value can be reduced and, by extension, errors in corresponding brightness and final estimated brightness can be reduced. In other words, according to the present embodiment, final estimated brightness can be calculated with higher accuracy than the first embodiment.

In addition, in the present embodiment, as depicted in the regions B and C in FIG. 18, the plurality of sub surface light sources are sectioned more roughly the further away from the calculation target position. Specifically, among the sub surface light sources that are outside of a predetermined range from the calculation target position, a distance between an inner periphery and an outer periphery of a sectioned region (the region C) including sub surface light sources that are away from the calculation target position is longer than a distance between an inner periphery and an outer periphery of a sectioned region (the region B) including sub surface light sources that are close to the calculation target position. Accordingly, the number of sectioned regions can be reduced and the amount of computations can be reduced.

Moreover, when the distance between sub surface light sources and the calculation target position is long, since attenuation coefficients are similar even when distances slightly vary among the sub surface light sources, the error in corresponding brightness of a sectioned region including sub surface light sources that are away from the calculation target position is small. Therefore, even if the plurality of sub surface light sources is more roughly sectioned the further away from the calculation target position, a calculation accuracy of the final estimated brightness hardly declines.

Figure 19:
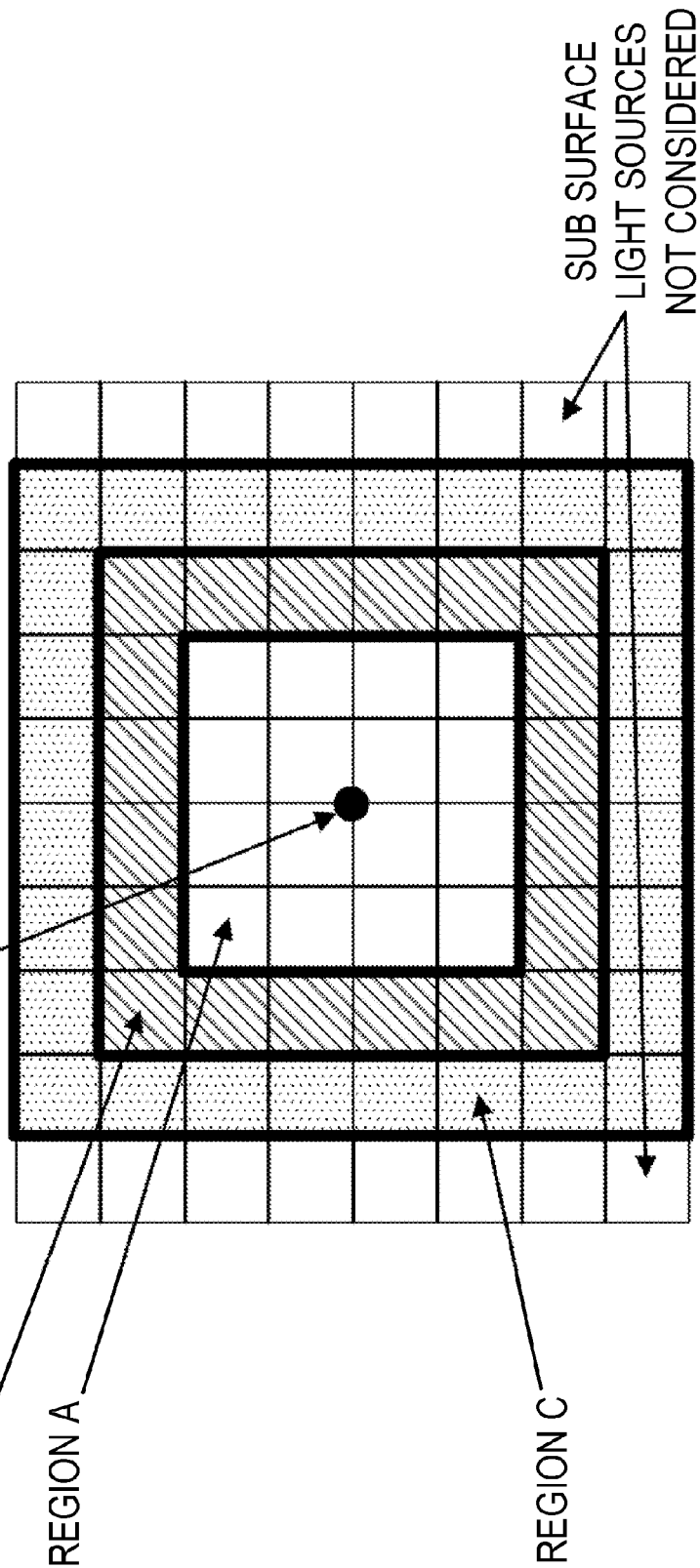
FIG. 19 is a diagram showing an example of a sectioned region according to the third embodiment.

Moreover, while an example of a case where the distance between the inner periphery and the outer periphery of the region C is longer than the distance between the inner periphery and the outer periphery of the region B has been described in the present embodiment, the distances may be equal to each other. In addition, when attenuation of light from the sub surface light sources is steep, light from sub surface light sources whose distances from the calculation target position are long hardly affects the brightness at the target position. Therefore, the final estimated brightness (the brightness at the calculation target position when light is emitted from a plurality of sub surface light sources) may be calculated without considering light from sub surface light sources whose distances from the calculation target position are equal to or greater than a predetermined distance. For example, grouping may be performed as shown in FIG. 19. In FIG. 19, a region A is a region for which the effect of light from sub surface light sources is finely calculated, and regions B and C are regions for which the effect of light from sub surface light sources is roughly calculated. In the example shown in FIG. 19, sub surface light sources at right and left edges are not sectioned into sectioned regions (groups). In other words, in the example shown in FIG. 19, the sub surface light sources at the right and left edges are sectioned as sub surface light sources that are not considered when calculating final estimated brightness.

Moreover, when reduction of processing time is given a higher priority than improving the calculation accuracy of final estimated brightness, the number of sectioned regions may be reduced. For example, in FIGS. 18 and 19, the regions B and C may be treated as a single sectioned region. Furthermore, as shown in FIG. 20, sub surface light sources that are inside of a predetermined range from the calculation target posit ion may be sectioned into sectioned regions including a plurality of sub surface light sources. In doing so, in order to prevent a significant decline in the calculation accuracy of final estimated brightness, the number of sub surface light sources in sectioned regions inside of the predetermined range from the calculation target position is favorably set smaller than the number of sub surface light sources in sectioned regions outside of the predetermined range from the calculation target position. In the example shown in FIG. 20, 16 sub surface light sources inside of the predetermined range from the calculation target position are sectioned into four sectioned regions A1 to A4 that respectively has four sub surface light sources arranged in two rows and two columns.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-177351, filed on Aug. 9, 2012, and Japanese Patent Application No. 2013-118762, filed on Jun. 5, 2013, which are hereby incorporated by reference herein in their entirety.

What is claimed is:

1. A brightness calculating apparatus that calculates brightness at a calculation target position on an emission surface when light is emitted from a plurality of light sources of a light source unit, the brightness calculating apparatus comprising:
a storage unit configured to store a plurality of attenuation coefficients corresponding to the calculation target position, for the plurality of light sources; and
a processor programmed to function as a device that comprises:
a setting unit configured to set a calculation target position on the emission surface;
a sectioning unit configured to section the plurality of light sources into a plurality of sectioned regions in accordance with the calculation target position set by the setting unit; and
a calculating unit configured to calculate the brightness at the calculation target position when light is emitted from the plurality of light sources by calculating, for each of the sectioned regions, the brightness at the calculation target position due to one or more light sources in each of the sectioned regions and summing up calculation results of the respective sectioned regions, wherein
the sectioning unit sections light sources inside of a predetermined range from the calculation target position into a plurality of first sectioned regions respectively including a single light source, and sections light sources outside of the predetermined range from the calculation target position into one or more second sectioned regions respectively including two or more light sources,
for each of the plurality of first sectioned regions, the calculating unit calculates the brightness at the calculation target position by using the attenuation coefficient of a single light source of each of the plurality of first sectioned regions as an attenuation coefficient of each of the plurality of first sectioned regions, and
for each second sectioned region, the calculating unit calculates the brightness at the calculation target position by using a representative value of attenuation coefficients of the two or more light sources of each second sectioned region as an attenuation coefficient of each second sectioned region.

2. The brightness calculating apparatus according to claim 1, wherein for each of a plurality of divided regions obtained by dividing the emission surface, the sectioning unit sections all light sources that are outside of the predetermined range from the calculation target position among the light sources in the divided region into a single second sectioned region.

3. The brightness calculating apparatus according to claim 2, wherein the plurality of divided regions are regions whose size and position are determined respectively in advance.

4. The brightness calculating apparatus according to claim 3, wherein the plurality of divided regions are regions obtained by dividing the emission surface in a matrix pattern, with the division being implemented based on a center position of the emission surface.

5. The brightness calculating apparatus according to claim 2, wherein the plurality of divided regions are regions obtained by dividing the emission surface in a matrix pattern, with the division being implemented based on the calculation target position.

6. The brightness calculating apparatus according to claim 1, wherein for each first sectioned region including a single light source, the calculating unit calculates brightness of light, which is emitted from each of the plurality of first sectioned regions, at the calculation target position by multiplying a set emission brightness of the single light source by an attenuation coefficient of the light, which is emitted from each of the plurality of first sectioned regions, at the calculation target position, and for each second sectioned region including two or more light sources respectively, the calculating unit calculates brightness of light, which is emitted from each second sectioned region, at the calculation target position by multiplying a summation of a set emission brightness of the two or more light sources by an attenuation coefficient of the light, which is emitted from each second sectioned region, at the calculation target position.

7. The brightness calculating apparatus according to claim 1, wherein the representative value is an average value of attenuation coefficients of the two or more light sources.

8. The brightness calculating apparatus according to claim 1, wherein the storage unit stores an attenuation coefficient at the calculation target position for each first sectioned region and each second sectioned region.

9. The brightness calculating apparatus according to claim 1, wherein the storage unit stores attenuation information representing a relationship between distances from each of the plurality of light sources and attenuation rates, wherein
for each of the plurality of first sectioned regions and second sectioned regions, the calculating unit works out a distance between a position of each of the plurality of first sectioned regions and second sectioned regions and the calculation target position, and
for each of the plurality of first sectioned regions and second sectioned regions, the calculating unit calculates an attenuation coefficient of each of the plurality of first sectioned regions and second sectioned regions using the obtained distances of the first and second sectioned regions and the attenuation information.

10. The brightness calculating apparatus according to claim 9, wherein for each first sectioned region including a single light source, the calculating unit works out a distance between a position of the single light source and the calculation target position as a distance between a position of each of the plurality of first sectioned regions and the calculation target position, and for each second sectioned region including two or more light sources, the calculating unit works out distances between respective positions of the two or more light sources and the calculation target position and calculates an average value of the obtained distances as a distance between a position of each second sectioned region and the calculation target position.

11. The brightness calculating apparatus according to claim 1, wherein each second sectioned region encloses a region of the predetermined range from the calculation target position.

12. The brightness calculating apparatus according to claim 1, wherein the second sectioned regions include a third sectioned region which encloses a region of the predetermined range from the calculation target position, and a fourth sectioned region which enclosed the third sectioned region.

13. A display apparatus comprising:
a brightness calculating apparatus according to claim 1;
a light source unit including a plurality of light sources; and
a display unit which transmits light from the light source unit in accordance with image data.

14. The display apparatus according to claim 13, wherein the light source unit including one or more light sources positioned outside of the one or more second sectioned regions.

15. A control method, implemented by a processor, for a brightness calculating apparatus that calculates brightness at a calculation target position on an emission surface when light is emitted from a plurality of light sources of a light source unit, the control method comprising:
storing with the processor a plurality of attenuation coefficients corresponding to the calculation target position, for the plurality of light sources, into a storage unit;
setting with the processor a calculation target position on the emission surface;
sectioning with the processor the plurality of light sources into a plurality of sectioned regions in accordance with the calculation target position set in the setting step; and
calculating with the processor the brightness at the calculation target position when light is emitted from the plurality of light sources by calculating, for each of the sectioned regions, the brightness at the calculation target position due to one or more light sources in each of the sectioned regions and summing up calculation results of the respective sectioned regions, wherein
in the sectioning, light sources inside of a predetermined range from the calculation target position, into a plurality of first sectioned regions respectively including a single light source, and sectioning, light sources outside of the predetermined range from the calculation target position, into one or more second sectioned regions respectively including two or more light sources,
for each of the plurality of first sectioned regions, the calculating step calculates the brightness at the calculation target position by using the attenuation coefficient of a single light source of each of the plurality of first sectioned regions as an attenuation coefficient of each of the plurality of first sectioned regions, and
for each second sectioned region, the calculating step calculates the brightness at the calculation target position by using a representative value of attenuation coefficients of the two or more light sources of each second sectioned region as an attenuation coefficient of each second sectioned region.

16. A brightness calculating apparatus that calculates brightness at a calculation target position on an emission surface, the brightness being brightness when light is emitted from a plurality of light units, the brightness calculating apparatus comprising:
a storage unit configured to store a plurality of attenuation coefficients corresponding to the calculation target position, for the plurality of light units; and
a processor programmed to function as a device that comprises:
a setting unit configured to set a calculation target position on the emission surface;
a sectioning unit configured to section the plurality of light units into a plurality of sectioned regions in accordance with the calculation target position set by the setting unit; and
a calculating unit configured to calculate the brightness at the calculation target position by calculating, for each of the sectioned regions, the brightness at the calculation target position due to one or more light units in each of the sectioned regions and summing up calculation results of the respective sectioned regions, wherein
the sectioning unit sections light units inside of a predetermined range from the calculation target position into a plurality of first sectioned regions respectively including a single light unit, and sections light units outside of the predetermined range from the calculation target position into one or more second sectioned regions respectively including two or more light units,
for each of the plurality of first sectioned regions, the calculating unit calculates the brightness at the calculation target position by using the attenuation coefficient of a single light unit of each of the plurality of first sectioned regions as an attenuation coefficient of each of the plurality of first sectioned regions, and
for each second sectioned region, the calculating unit calculates the brightness at the calculation target position by using a representative value of attenuation coefficients of the two or more light units of each second sectioned region as an attenuation coefficient of each second sectioned region.

17. The brightness calculating apparatus according to claim 16, wherein each second sectioned region encloses a region of the predetermined range from the calculation target position.

18. The brightness calculating apparatus according to claim 16, wherein the second sectioned regions include a third sectioned region which encloses a region of the predetermined range from the calculation target position, and a fourth sectioned region which enclosed the third sectioned region.

19. A display apparatus comprising:
a brightness calculating apparatus according to claim 16;
a plurality of light units; and
a display unit which transmits light from the plurality of light units in accordance with image data.

20. The display apparatus according to claim 19, wherein the light units including one or more light units which is positioned outside of the one or more second sectioned regions.

* * * * *